(12) United States Patent
Antoine

(10) Patent No.: US 9,714,713 B2
(45) Date of Patent: Jul. 25, 2017

(54) SEAL RING WITH FRICTIONAL LOAD SURFACE

(71) Applicant: Caterpillar Inc., Peoria, IL (US)

(72) Inventor: Darren B. Antoine, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 13/721,871

(22) Filed: Dec. 20, 2012

(65) Prior Publication Data
US 2014/0175753 A1 Jun. 26, 2014

(51) Int. Cl.
*F16J 15/34* (2006.01)

(52) U.S. Cl.
CPC ................... *F16J 15/344* (2013.01)

(58) Field of Classification Search
CPC ....................................................... F16J 15/344
USPC .............. 277/358, 377, 380–382, 652, 385
See application file for complete search history.

(56) References Cited

U.S. PATENT DOCUMENTS

| | | | |
|---|---|---|---|
| 3,004,807 A | | 10/1961 | Kniepkamp |
| 3,086,782 A | * | 4/1963 | Peickii et al. ............... 277/398 |
| 3,272,519 A | * | 9/1966 | Voitik ........................... 277/380 |
| 3,322,431 A | * | 5/1967 | Solari ........................... 277/380 |
| 3,524,654 A | * | 8/1970 | Hasselbacher et al. ...... 277/382 |
| 3,542,377 A | * | 11/1970 | Voitik ........................... 277/380 |
| 3,767,214 A | * | 10/1973 | Kawamura ................... 277/358 |
| 3,985,366 A | | 10/1976 | Plouzek |
| 4,083,569 A | * | 4/1978 | Negro ........................... 277/381 |
| 4,087,100 A | * | 5/1978 | Yoshihashi et al. .......... 277/399 |
| 4,105,214 A | * | 8/1978 | Schexnayder ............... 277/364 |
| 4,111,436 A | * | 9/1978 | Yazawa ......................... 277/381 |
| 4,168,072 A | * | 9/1979 | Fukui ............................ 277/403 |
| 4,183,542 A | * | 1/1980 | Quartara ....................... 277/381 |
| 4,419,086 A | * | 12/1983 | Condon .......................... 464/14 |
| 4,489,952 A | * | 12/1984 | Ohtsuka ....................... 277/399 |
| 4,513,977 A | * | 4/1985 | Umeha et al. ................ 277/406 |
| 4,747,604 A | * | 5/1988 | Nakamura .................... 277/382 |
| 4,753,304 A | * | 6/1988 | Kelly, Jr. ...................... 175/371 |
| 4,824,123 A | | 4/1989 | Chia et al. |
| 4,844,483 A | * | 7/1989 | Iijima et al. .................. 277/382 |

(Continued)

FOREIGN PATENT DOCUMENTS

| | | |
|---|---|---|
| EP | 1801471 A1 | 6/2007 |
| WO | 89/00246 A1 | 1/1989 |

OTHER PUBLICATIONS

H001180, May 4, 1993, Arianoutsos et al.

*Primary Examiner* — Kristina Fulton
*Assistant Examiner* — Eugene G Byrd
(74) *Attorney, Agent, or Firm* — William R. Tinker

(57) ABSTRACT

A seal ring is disclosed. The seal ring can have one or more exterior surfaces extending between a first outer axial end of the seal ring to a seal flange. The seal flange can be positioned adjacent to a second outer axial end of the seal ring and can extend radially outward to an outer diameter of the seal ring. An outer surface of the seal flange can form an annular sealing band. A seal ramp can extend outwardly from a first end proximate to the first outer axial end of the seal ring to a second end positioned adjacent to the seal flange. The seal ramp can include a first surface configured to form a frictional, sealing contact interface between the first surface and an elastomeric seal compressed into contact with the first surface when the elastomeric seal is in a loaded state.

19 Claims, 7 Drawing Sheets

(56) References Cited

U.S. PATENT DOCUMENTS

| | | | |
|---|---|---|---|
| H1180 H * | 5/1993 | Arianoutsos et al. | 277/381 |
| 5,560,621 A * | 10/1996 | Zutz | 277/382 |
| 5,642,890 A * | 7/1997 | Zutz | 277/380 |
| 5,673,921 A | 10/1997 | Zutz | |
| 6,047,969 A | 4/2000 | Hoefft et al. | |
| 6,053,506 A * | 4/2000 | Zutz | 277/651 |
| 6,086,069 A * | 7/2000 | Bedford | 277/380 |
| 6,186,511 B1 * | 2/2001 | Anderson et al. | 277/380 |
| 6,213,471 B1 * | 4/2001 | Anderson et al. | 277/380 |
| 6,736,404 B1 | 5/2004 | Shuster | |
| 6,749,202 B1 | 6/2004 | Smith | |
| 6,976,681 B2 * | 12/2005 | Zutx | 277/358 |
| 7,681,889 B2 * | 3/2010 | Tsuboi et al. | 277/377 |
| 7,798,248 B2 | 9/2010 | Stauffer | |
| 7,887,061 B2 | 2/2011 | Van Dyke et al. | |
| 7,997,659 B2 | 8/2011 | Oertley et al. | |
| 8,226,088 B2 | 7/2012 | Kometani | |
| 2004/0026870 A1 * | 2/2004 | Maguire et al. | 277/377 |
| 2004/0256808 A1 * | 12/2004 | Tsuboi et al. | 277/377 |
| 2007/0241512 A1 * | 10/2007 | Tsuboi | 277/370 |
| 2009/0212500 A1 * | 8/2009 | Kometani | 277/380 |
| 2012/0161510 A1 | 6/2012 | Diekevers et al. | |
| 2012/0248706 A1 | 10/2012 | Hoppe et al. | |

* cited by examiner

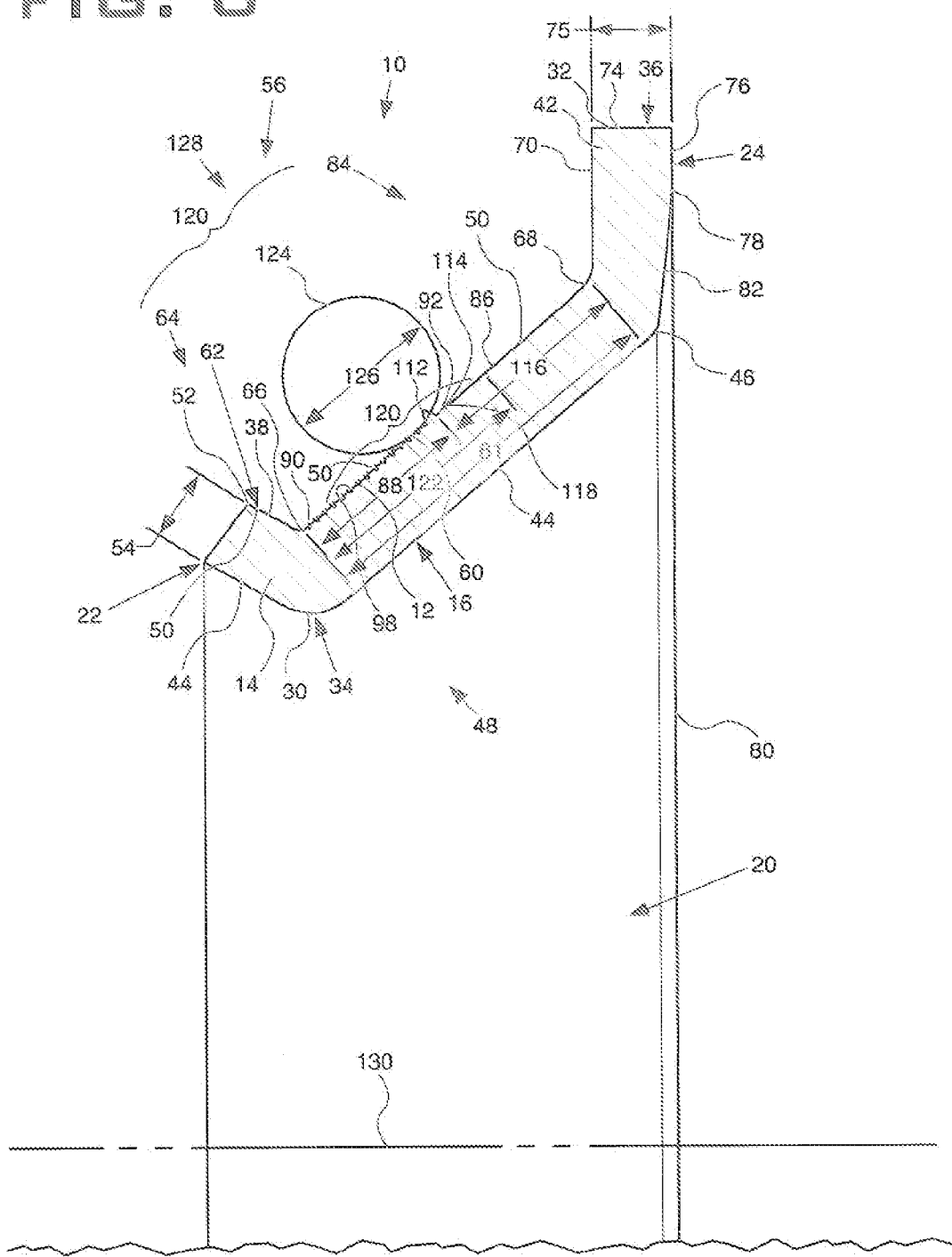

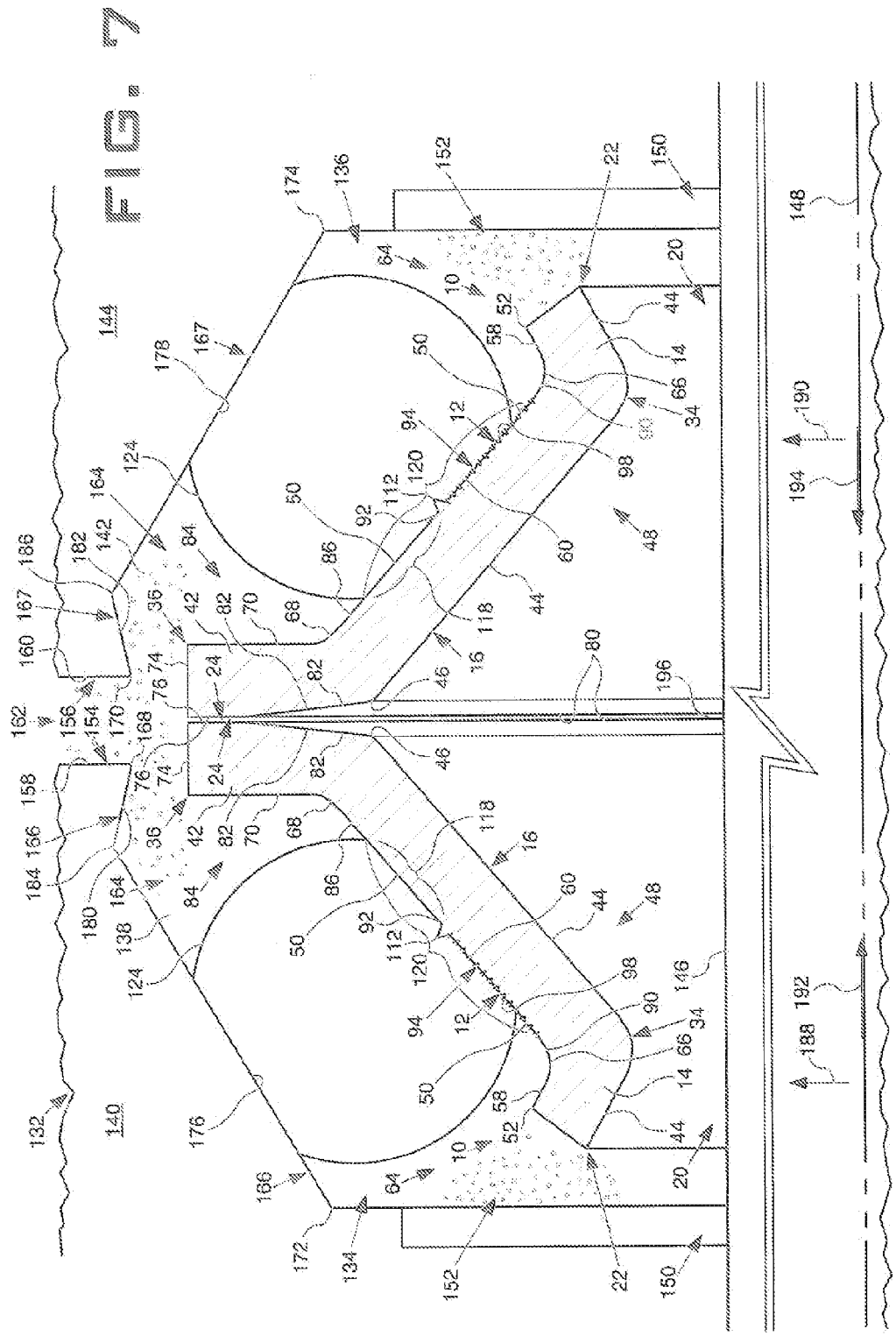

SEAL RING WITH FRICTIONAL LOAD SURFACE

TECHNICAL FIELD

The present disclosure relates to a seal ring, and more particularly, to a seal ring with a frictional load surface.

BACKGROUND

Seal rings, such as those which may be formed of metal or other durable material, may be utilized in conjunction with a resilient sealing member such as an elastomeric O-ring or toric seal, to form a seal assembly. Such seal assemblies may provide sealing functionalities and capabilities in a variety of different applications, including but not limited to machines, machine systems, mechanical systems and/or components thereof having relatively rotating components. The subject seal assemblies may be installed and/or positioned between machine or mechanical system components which are rotatable relative to one another to retain lubricant and exclude foreign matter from the vicinity of internal bearing surfaces. In particular, a seal ring, in conjunction with an O-ring or toric seal, may be maintained in an elastomerically supported position within the inner surfaces of particular housing or component as well as in resilient, abutting contact with surfaces of a confronting, relatively rotatable housing or component, or seal assembly positioned and supported therein. However, each seal assembly's ability to maintain a seal and thereby retain lubricant and exclude foreign matter from the vicinity of internal bearing surfaces between relatively rotatable machine or mechanical system components can be compromised if foreign matter and/or lubricant are introduced to compromise the integrity of the abutting, sealing contact between surfaces of each seal assembly and those of the rotatable machine or mechanical system components and, in some applications, an additional associated seal assembly.

U.S. Pat. No. 8,226,088 (the '088 patent) to Kometani, discloses a floating seal including a pair of housings which are relatively rotatable on a common axis. Each housing supports a floating ring with an elastic ring in between. The floating rings are slidably sealed together by the elasticity of the elastic rings. A rough surface is formed on an outer circumferential contact surface of each one of the floating rings facing an associated elastic ring, and a rough surface is additionally formed on an inner circumferential contact surface of each one of the housings opposing each associated elastic ring. In one embodiment, a thin film-like elastic layer is secured to a contact surface of a portion of the contact surface between each floating ring and associated elastic ring located near a sealing side of each floating ring. Additionally, a thin film-like elastic layer is secured to a contact surface of a portion of the contact surface between each housing and associated elastic ring located near a sealing side of each corresponding floating ring. In a second embodiment, elastic layers are coated on and secured to the entire contact surfaces of each floating ring and each housing with respect to the elastic rings, without forming the rough surfaces on the housings and the floating rings. In a third embodiment, machined smooth portions are formed on portions of both of the floating rings and the housings located near a sealing side and rough surfaces thereof. Finally, in a fourth embodiment, each of the floating rings include a coating layer formed of a rubber material with reduced softness covering an entire circumferential surface thereof.

The present disclosure is directed to mitigating or eliminating one or more of the drawbacks discussed above.

SUMMARY

One aspect of the present disclosure is directed to a seal ring. The seal ring can include one or more exterior surfaces which extend between a first outer axial end of the seal ring to a seal flange. The seal flange can be positioned adjacent to a second outer axial end of the seal ring and can extend radially outward from the one or more exterior surfaces to an outer diameter of the seal ring. An outer surface of the seal flange can form an annular sealing band. The annular sealing band can extend radially along the second outer axial end of the seal ring and can be positioned adjacent to the outer diameter of the seal ring. An inclined seal ramp can be formed by one or more of the one or more exterior surfaces of the seal ring, and can extend outwardly from a first end of the seal ramp proximate to the first outer axial end of the seal ring to a second end of the seal ramp positioned adjacent to the seal flange. The seal ramp can also include a first surface positioned adjacent to the first end of the seal ramp. The first surface can be configured to form a frictional, sealing contact interface between the first surface and an elastomeric seal compressed into contact with the first surface when the elastomeric seal is in a loaded state.

Another aspect of the present disclosure is directed to a seal assembly. The seal assembly can include an annular elastomeric seal. The seal assembly can additionally include a seal ring having a seal flange and one or more exterior surfaces which can extend between a first outer axial end of the seal ring to the seal flange. The seal flange can be positioned adjacent to a second outer axial end of the seal ring and can extend radially outward from the one or more exterior surfaces to an outer diameter of the seal ring. An outer surface of the seal flange can form an annular sealing band which can extend radially along the second outer axial end of the seal ring and can be positioned adjacent to the outer diameter of the seal ring. An inclined seal ramp can be formed by one or more of the one or more exterior surfaces of the seal ring, and can extend outwardly from a first end of the seal ramp proximate to the first outer axial end of the seal ring to a second end of the seal ramp positioned adjacent to the seal flange. The seal ramp can include a first surface which can be positioned adjacent to the first end of the seal ramp. The first surface can be configured to form a frictional, sealing contact interface between the first surface and an elastomeric seal compressed into contact with the first surface when the elastomeric seal is in a loaded state. The elastomeric seal can be mounted on one or more of the exterior surfaces of the seal ramp.

Yet another aspect of the present disclosure is directed to a seal ring. The seal ring can include an annular body extending axially between a first outer end and a second outer end. The annular body can include a collar which can be positioned adjacent to the first outer end of the annular body and a seal flange which can extend radially outwardly from the second outer end of the annular body to an outer diameter of the annular body. The annular body can additionally include an inclined seal ramp positioned between the collar and the seal flange. The inclined seal ramp can include a frictional exterior surface which can be positioned adjacent to the collar and a smooth exterior surface which can be positioned adjacent to the seal flange. The inclined seal ramp and collar can have a substantially uniform thickness which can extend throughout an axial width of the annular body from the first outer end of the annular body to the second outer end of the annular body.

BRIEF DESCRIPTION OF THE DRAWINGS

FIG. 6 is a cross sectional view of a seal assembly according to an exemplary embodiment of the present disclosure; and FIG. 7 is a diagrammatic cross sectional view of a sealed rotating assembly according to an exemplary embodiment of the present disclosure.

DETAILED DESCRIPTION

The present disclosure is directed to a seal ring with a frictional load surface which can be applicable to any configuration, assembly, machine and/or application in which seal rings of the type disclosed herein can be employed. In particular, at least one embodiment discloses a seal ring with a frictional load surface, and at least one additional embodiment of the present disclosure discloses a seal assembly which can include a seal ring with a frictional load surface and an elastomeric seal. At least one further embodiment discloses a sealed rotating assembly which can form, in part, a machine system or a component of a machine and can include one or more seal assemblies which can each include a seal ring with a frictional load surface and an elastomeric seal. Reference now will be made in detail to exemplary embodiments that are illustrated in the accompanying drawings. Wherever possible, the same reference numbers will be used throughout the drawings to refer to the same or like parts.

Figure 1:
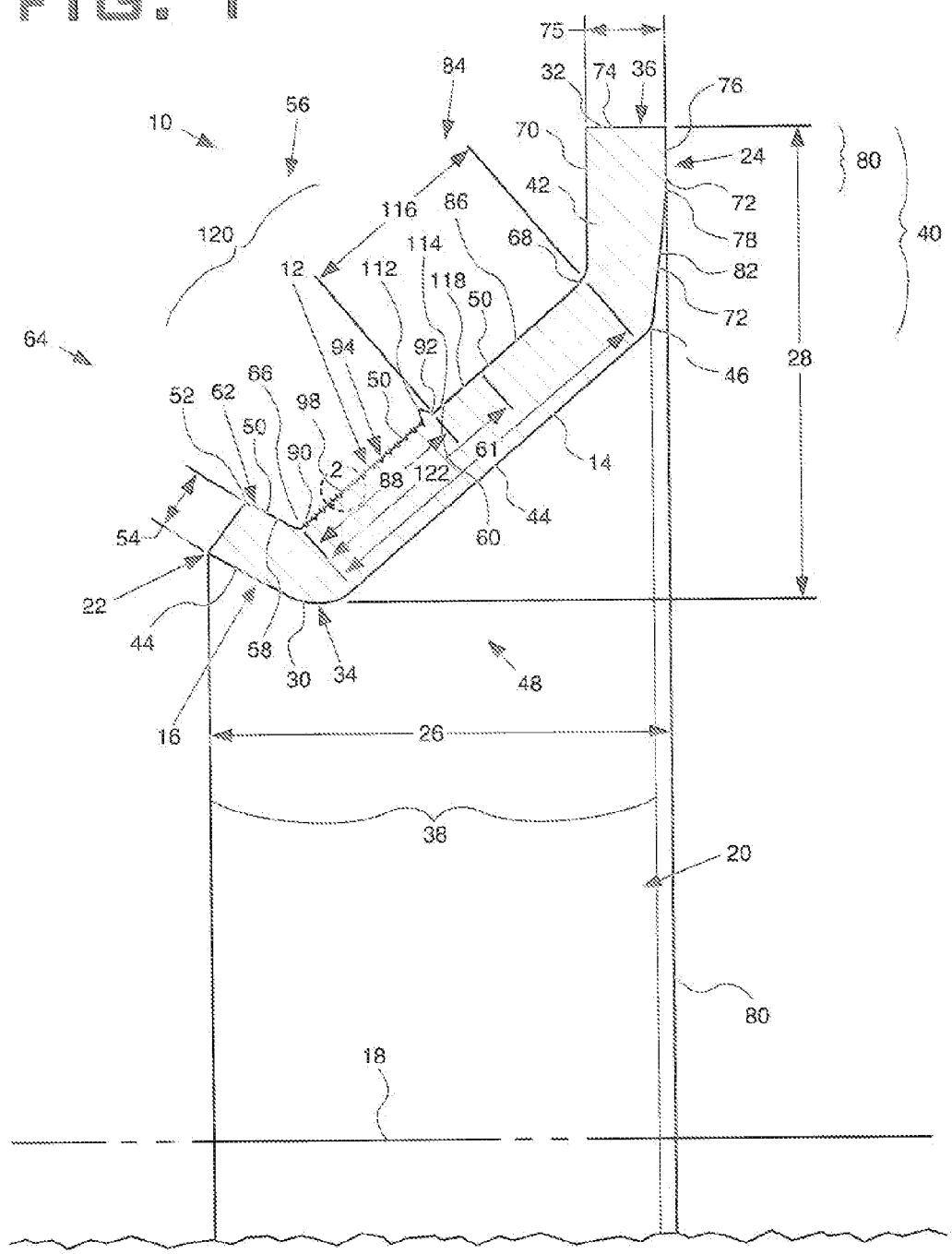
FIG. 1 is a cross sectional view of a seal ring according to an exemplary embodiment of the present disclosure.

An exemplary embodiment of a seal ring 10 with a frictional load surface 12 is illustrated in FIG. 1. As shown in the exemplary embodiment shown in FIG. 1, the seal ring 10 can be formed by an annular seal ring body 14 having a substantially uniform cross sectional profile 16 throughout the radial circumference of the seal ring 10, wherein the cross sectional profile 16 of the seal ring body 14 extends at a constant radially offset distance around a center longitudinal axis 18 to define the seal ring 10 as a circular, ring-shaped seal ring body 14 with a central opening 20 disposed axially therethrough. The cross sectional profile 16 of the seal ring body 14 can extend between a first outer axial end 22 and a second outer axial end 24 to define the overall axial width 26 of the seal ring 10. Additionally, the cross sectional profile 16 of the seal ring body 14 can have an overall radial length 28 which extends between an inner radial end 30 which is most proximal to the center longitudinal axis 18 of the seal ring 10 and an outer radial end 32 which is most distal to the center longitudinal axis 18 of the seal ring 10. As such, the an inner radial end 30 can define the inner diameter 34 of the seal ring 10 and the outer radial end 32 can define the outer diameter 36 of the seal ring 10.

The seal ring body 14 can be defined as a substantially solid, unitary body which can include a generally axially extending portion 38 and a generally radially extending portion 40. In one embodiment, the generally axially extending portion 38 extends from the first outer axial end 22 of the seal ring body 14 to the generally radially extending portion 40 which extends outwardly from the generally axially extending portion 38 along and/or adjacent to the second outer axial end 24 of the seal ring body 14 to define a seal flange 42. The generally axially extending portion 38 can include one or more interior axial surfaces 44 which are proximal to, facing, and/or generally oriented toward the center longitudinal axis 18 of the seal ring 10. The one or more interior axial surfaces 44 can extend in a generally axially and contiguous and/or interconnected fashion from the first outer axial end 22 of the seal ring body 14 to a second end 46 at or proximal and adjacent, to the second outer axial end 24 of the seal ring body 14. As such, the one or more interior axial surfaces 44 of the generally axially extending portion 38 can substantially define the inner circumferential profile 48 of the seal ring body 14 and the seal ring 10, and furthermore, one or more of the one or more interior axial surfaces 44 of the generally axially extending portion 38 can define the inner diameter 34 of the seal ring body 14 and seal ring 10. The generally axially extending portion 38 can additionally include one or more exterior axial surfaces 50 which are generally axially oriented to face outwardly and away from the center longitudinal axis 18 of the seal ring 10 in generally opposing, generally radially spaced relation from the one or more interior axial surfaces 44 to substantially define the thickness 54 or radial width of the generally axially extending portion 38 of the seal ring body 14 as extending therebetween. Accordingly, the one or more exterior axial surfaces 50 can, in part, define an outer circumferential profile 56 of the seal ring body 14 and the seal ring 10.

The one or more exterior axial surfaces 50 of the generally axially extending portion 38 can form an axially extending collar 58 as well as a seal ramp 60. The axially extending collar 58 can be positioned between the first outer axial end 22 of the seal ring body 14 and the seal ramp 60. In particular, in one embodiment, the one or more exterior axial surfaces 50 of the generally axially extending portion 38 which form the axially extending collar 58 can extend between a first outer end 52, which can be positioned at or proximate, and adjacent to the first outer axial end 22 of the seal ring body 14, and a first or inner radial end (such as 66, as described herein) of the seal ramp 60. In one embodiment, one or more of the one or more exterior axial surfaces 50 of the generally axially extending portion 38 can extend toward the first or inner radial end (such as 66, as described herein) of the inclined seal ramp 60 at a negative or declining angle or depressed contour relative to and toward the center longitudinal axis 18 of the seal ring 10 to define a portion of the axially extending collar 58 proximate to the first outer axial end 22 of the seal ring body 14 as including an upwardly-extending seal retaining lip 62. Additionally, and as described further herein, the one or more exterior axial surfaces 50 of the generally axially extending portion 38 positioned between the first outer axial end 22 of the seal ring body 14 and the inclined seal ramp 60, which can include those of the axially extending collar 58, can represent an oil side portion 64 of the outer circumferential profile 56 of the seal ring body 14.

The one or more exterior axial surfaces 50 of the generally axially extending portion 38 can additionally form a seal ramp 60 which can be positioned between the axially extending collar 58 and the seal flange 42. In particular, in one embodiment, the seal ramp 60 can be inclined at an increasing or positive angle with reference to the center longitudinal axis 18 of the seal ring 10 as the seal ramp 60 extends along a generally axially-extending width 61 from a first end 66 adjacent to the axially extending collar 58 (and proximate to the first outer axial end 22 of the seal ring body 14) to a second end 68 of the seal ramp 60 adjacent to the seal flange 42. In one example, the angle and position of the seal ramp 60 can be defined, in part, with reference to the center longitudinal axis 18 of the seal ring 10 as extending from the first end 66, which can be an inner radial end 66 of the seal ramp 60 which is radially proximal to the center longitudinal axis 18 of the seal ring 10, to the second end 68, which can be an outer radial end 68 of the seal ramp 60 which is radially distal to the center longitudinal axis 18 of the seal ring 10, with the one or more exterior axial surfaces 50 of the seal ramp 60 positioned therebetween. As such, the seal ramp 60 can be substantially frusto-conical and inclined at a predetermined load angle relative to the center longitudinal axis 18 of the seal ring 10 such that the second or outer radial end 68 of the seal ramp 60 is disposed radially outwardly with reference to the first or inner radial end 66 of the seal ramp 60 and toward the outer diameter 36 of the seal ring 10.

In one embodiment, the seal flange 42 can be positioned adjacent to the second outer axial end 24 of the seal ring 10 and can include one or more inner radial surfaces 70 and one or more outer radial surfaces 72 which project radially and outwardly from the generally axially extending portion 38 of the seal ring body 14 in offset, spaced relation to an outer axial surface 74 of the seal flange 42 to substantially define the thickness 75 of the generally radially extending portion 40 of the seal ring body 14 as extending between the one or more inner radial surfaces 70 and one or more outer radial surfaces 72. In particular, in one example, the one or more inner radial surfaces 70 of the seal flange 42 can extend radially outwardly between the second or outer radial end 68 of the seal ramp 60 and the outer axial surface 74 of the seal flange 42, and the one or more outer radial surfaces 72 of the seal flange 42 can extend radially along and/or proximate to the second outer axial end 24 of the seal ring body 14 between the second end 46 of the generally axially extending portion 38 and the outer axial surface 74 of the seal flange 42. The outer axial surface 74 of the seal flange 42 can be positioned distally with respect to the center longitudinal axis 18 of the seal ring 10 to extend between the outer radial end of the one or more inner radial surfaces 70 and the outer radial end of the one or more outer radial surfaces 72 along the outer radial end 32 of the seal ring body 14 to thus define the outer diameter 36 of the seal ring 10. The one or more outer radial surfaces 72 of the seal flange 42 can include a seal face surface 76 which extends radially and perpendicularly with reference to the center longitudinal axis 18 of the seal ring 10 from the outer axial surface 74 of the seal flange 42, and accordingly, in one embodiment, the outer diameter 36 of the seal ring 10, to an inner radial end 78. The seal face surface 76 can extend along and define, at least in part, the second outer axial end 24 of the seal ring body 14 to furthermore, and accordingly, define the second outer axial end 24 as the sealing end 24 of the seal ring 10. Additionally, the seal face surface 76 can form an annular sealing band 80 which extends circumferentially along and can define the outer radial periphery of the second outer axial end 24, or the sealing end 24 of the seal ring body 14 and can be positioned adjacent to the outer diameter 36 of the seal ring 10. Furthermore, in one embodiment, the seal flange 42 can additionally include a tapered surface 82 which extends from the inner radial end 78 of the seal face surface 76 to the second end 46 of the one or more interior axial surfaces 44 of the generally axially extending portion 38 of the seal ring body 14. As described further herein, the one or more inner radial surfaces 70 and the outer axial surface 74 of the seal flange 42 as well as the second end 68 of the seal ramp 60 (in addition to a portion of the exterior axial surfaces 50 of the seal ramp 60 proximate thereto), can represent an air side portion 84 of the outer circumferential profile 56 of the seal ring body 14 which is exposed to the outside environment.

The one or more exterior axial surfaces 50 of the generally axially extending portion 38 of the seal ring body 14 additionally include a frictional load surface 12 as well as a smooth surface 86. As provided herein, the frictional load surface 12 can be formed as a contoured and/or textured sealing band having a generally axially extending width 88 which extends from a first end 90 to a second end 92 along a portion of the seal ramp 60 to define an area of increased contact stress which extends radially along the outer circumference of the seal ring 10. In particular, the frictional load surface 12 can include a surface texture 94 configured, in part, to create and maintain a frictional, sealing contact interface between an elastomeric seal (such as elastomeric seal 124, described herein) and the frictional load surface 12 such that the elastomeric seal is prevented from spinning or slipping relative to the seal ring 10. In one embodiment, the surface texture 94 of the frictional load surface 12 can be formed on or within the exterior, axial frictional load surface 12 of the seal ramp 60 to provide the frictional load surface 12 with a predefined surface roughness. In one example, the surface texture 94 of the frictional load surface 12 can have a surface roughness corresponding to an arithmetic mean height, Ra of less than 20 μm. In another example, the surface texture 94 of the frictional load surface 12 can have a surface roughness corresponding to an arithmetic mean height, Ra of less than 15 μm. In yet another example, the surface texture 94 of the frictional load surface 12 can have a surface roughness corresponding to an arithmetic mean height, Ra of between than 3.75-8.74 μm. Notwithstanding, the foregoing specific surface roughness values are illustrative of exemplary embodiments, and additional surface roughness values of the surface texture 94 of the frictional load surface 12 are contemplated without departing from the scope of the present disclosure.

Figure 3:
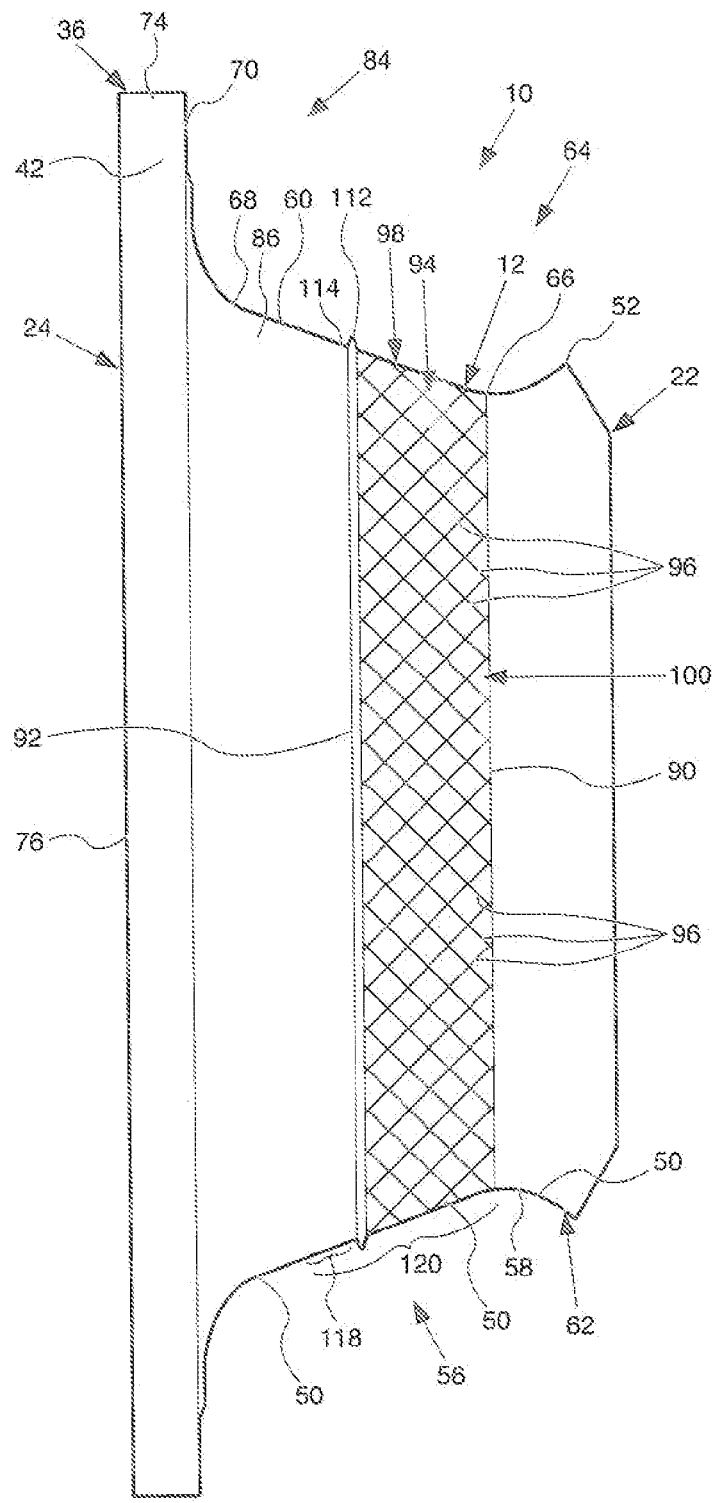
FIG. 3 is a side view of a seal ring according to an exemplary embodiment of the present disclosure.
Figure 4:
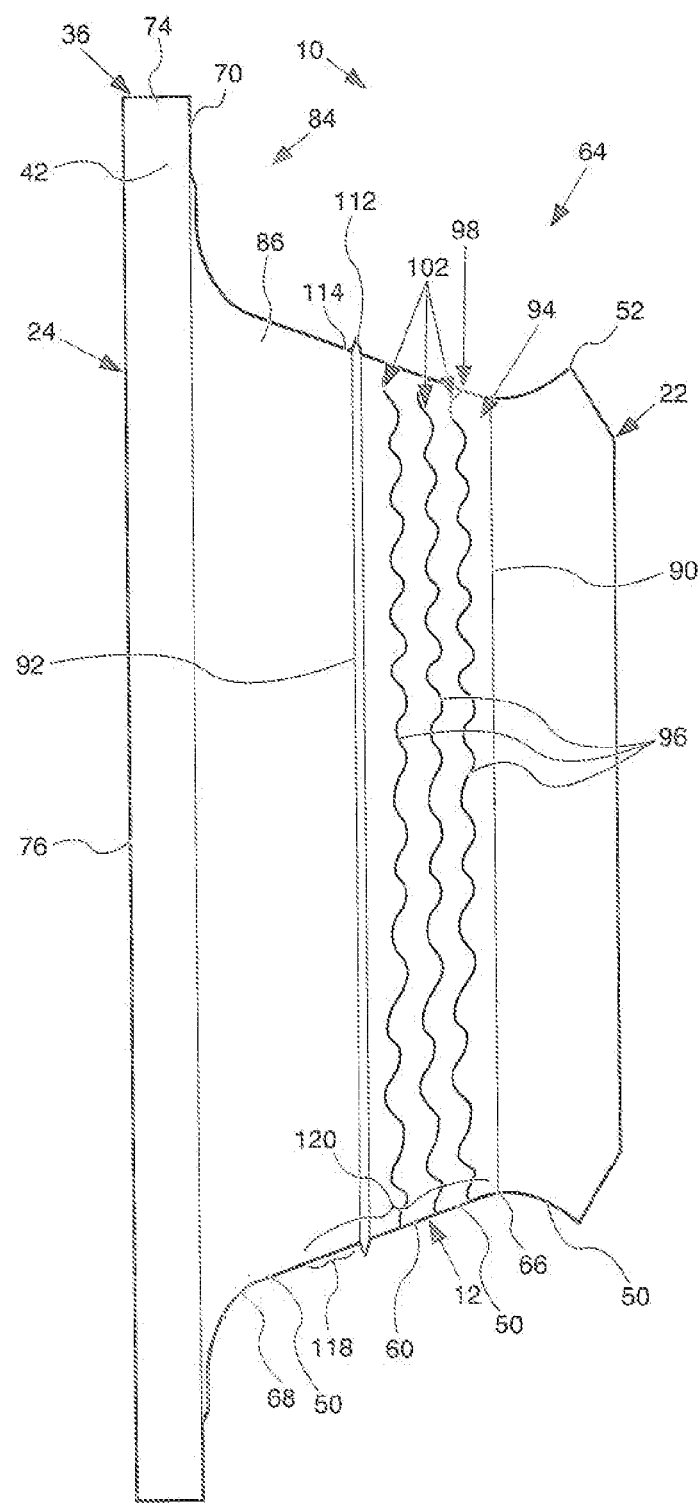
FIG. 4 is a side view of a seal ring according to an exemplary embodiment of the present disclosure.
Figure 5:
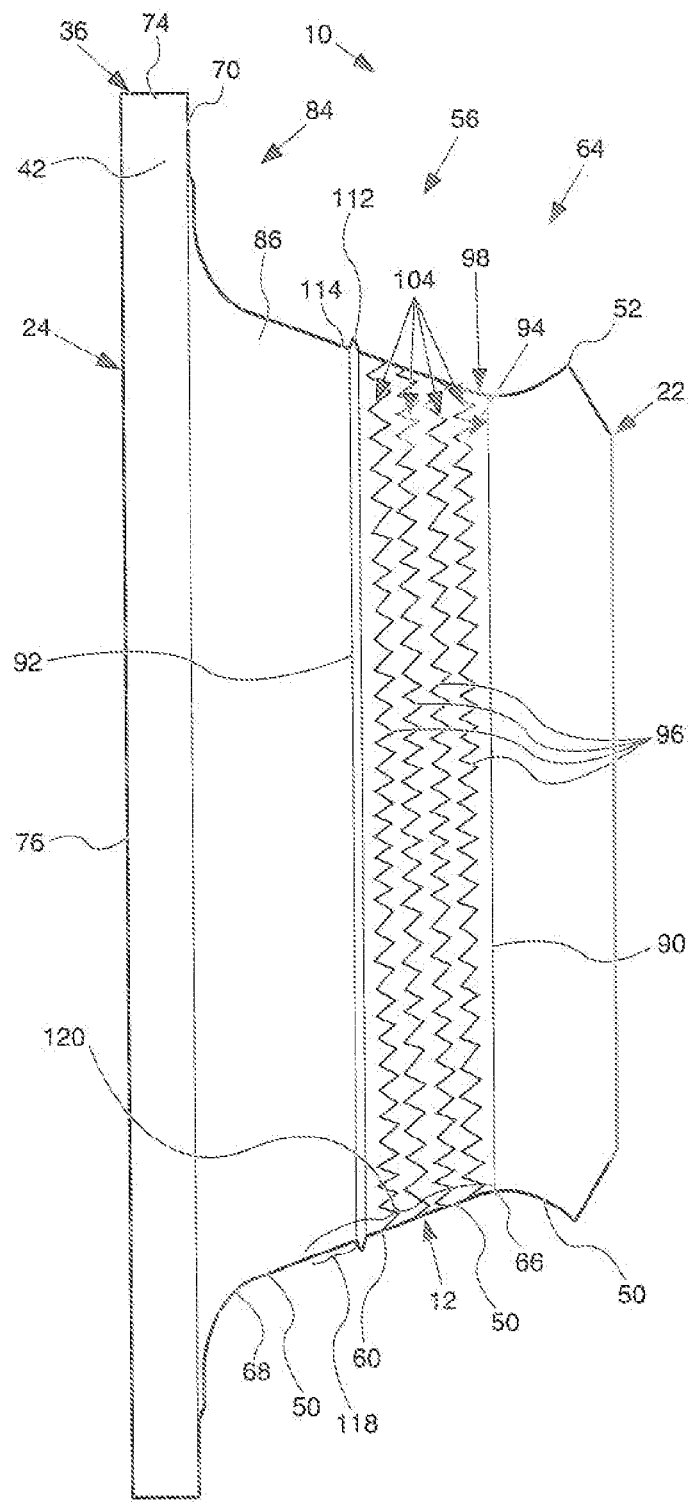
FIG. 5 is a side view of a seal ring according to an exemplary embodiment of the present disclosure.

In one embodiment, the frictional load surface 12 can include a plurality of grooves or channels 96 which can form a textured pattern 98 in the frictional load surface 12, wherein the textured pattern 98 can, at least in part, define the surface texture 94 and the surface roughness of the frictional load surface 12. The plurality of grooves or channels 96, and the textured pattern 98 formed thereby, can extend and/or can be positioned between the first end 90 and the second end 92 of the frictional load surface 12. In one example as shown in FIG. 3, the plurality of grooves or channels 96 can each extend linearly and generally axially along and into the outer circumference of the seal ring 10 to define the textured pattern 98 of the frictional load surface 12 as including overlapping series of substantially uniformly spaced, angled grooves or channels 96 which extend from the first end 90 to the second end 92 of the frictional load surface 12 to form a crosshatched pattern 100 having a network of intersecting grooves or channels 96. In another embodiment, the textured pattern 98 can be defined as including a series of grooves or channels 96 each having a curvilinear, repeating sinusoidal profile which is formed into and extends generally linearly and radially along the outer circumference of the seal ring 10 between the first end 90 and the second end 92 of the frictional load surface 12 to form a generally sinusoidal or sine wave pattern 102, as shown in the exemplary embodiment illustrated in FIG. 4. In yet another embodiment as shown in the exemplary embodiment illustrated in FIG. 5, the textured pattern 98 can be defined as including a series of grooves or channels 96 each having a profile which is characterized by a repeating series of interconnected, oppositely angled adjacent segments formed into and extending generally linearly and radially along the outer circumference of the seal ring 10 between the first end 90 and the second end 92 of the frictional load surface 12 to form a "sawtooth" pattern 104. The foregoing patterns are illustrative of exemplary embodiments, as additional shapes and arrangements of grooves or channels 96 (and/or combinations thereof) forming additional textured patterns 98 within the frictional load surface 12 are contemplated without departing from the scope of the present disclosure.

Figure 2:
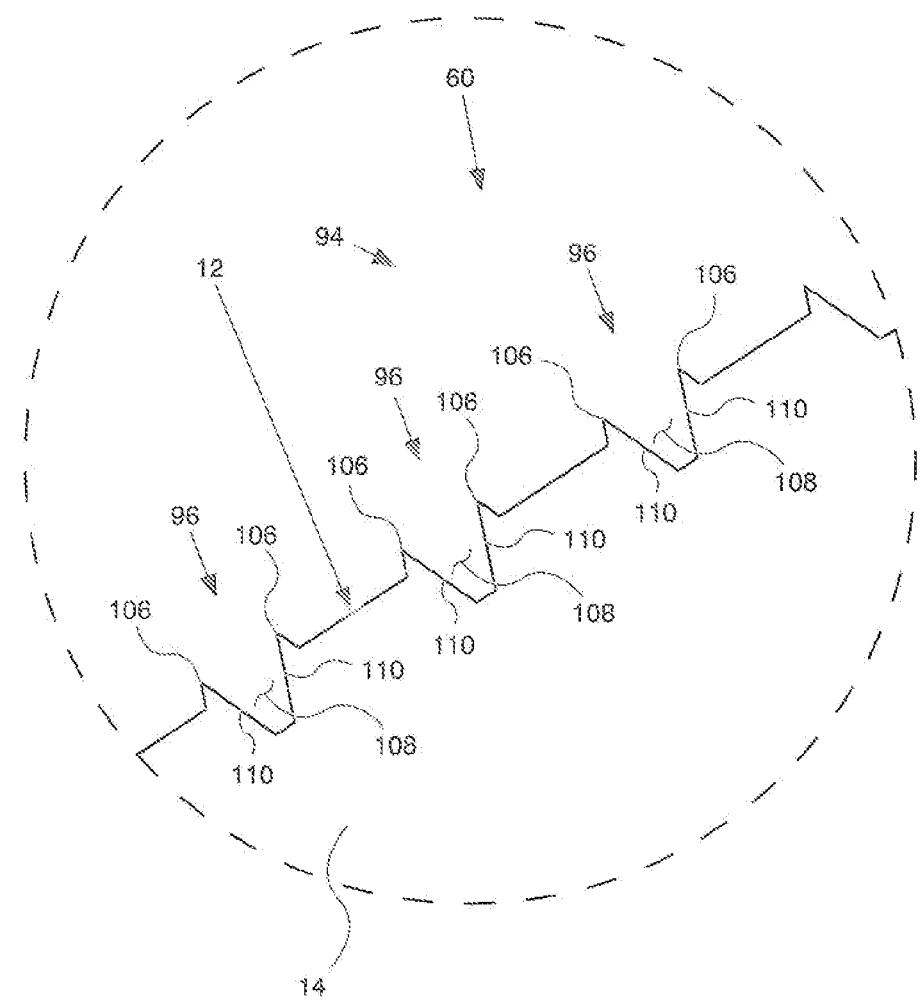
FIG. 2 is an enlarged cross-sectional view of the seal ring according to an exemplary embodiment of the present disclosure illustrated in FIG. 1.

The grooves or channels 96 of the frictional load surface 12 can be mechanically impressed, formed, or otherwise disposed to extend into the frictional load surface 12 of the seal ramp 60. In one embodiment, as shown in the enlarged cross-sectional view of the frictional load surface 12 illustrated in FIG. 2, each of the plurality of grooves or channels 96 can be formed to include raised ridges 106 which protrude outward from one or both sides of a cavity 108 impressed, formed, or otherwise disposed into the outer, axial, frictional load surface 12 of the seal ring body 14 which defines each groove or channel 96. In particular, in one example and as shown in the exemplary embodiment illustrated in FIG. 2, each raised ridge 106 can be a sharpened protrusion or burr of deformed or otherwise displaced material of the seal ring body 14 formed as a raised extension of one or both interior edges 110 of the cavity 108 of each groove or channel 96 which can protrude outward therefrom to extend above the exterior axial surface 50 of the seal ramp 60 along substantially all or a portion of each of the plurality of grooves or channels 96.

As provided above, the one or more exterior axial surfaces 50 of the generally axially extending portion 38 additionally include a smooth surface 86. As provided herein, the smooth surface 86 can be positioned along a portion of the seal ramp 60 in between the frictional load surface 12 and the seal flange 42 to define an area of reduced or minimal surface texture which extends radially along the outer circumference of the seal ring 10. In one embodiment, the smooth surface 86 can be machined, finished or otherwise formed as a low-friction and/or low surface area surface having a surface roughness lower than that of the frictional load surface 12 such that the smooth surface 86 is substantially free of texture upon which dust, dirt, debris, mud, moisture or any other foreign matter (such as foreign matter 164, as discussed herein) can attach and/or accumulate. In one example, the smooth surface 86 can have a surface roughness corresponding to an arithmetic mean height, Ra of less than 4.00 μm. In another example, the smooth surface 86 can have a surface roughness corresponding to an arithmetic mean height, Ra of between 0.10-3.74 μm. Notwithstanding, the foregoing specific surface roughness values are illustrative of exemplary embodiments, and additional surface roughness values of the smooth surface 86 are contemplated without departing from the scope of the present disclosure.

In one embodiment, the frictional load surface 12 can be positioned to extend along a portion of the seal ramp 60 to define an area of increased contact stress along the outer circumference of the seal ring 10 that is proximal to the first outer axial end 22 of the seal ring body 14 and is positioned adjacent to the oil side portion 64 of the outer circumferential profile 56 of the seal ring body 14. Additionally, the smooth surface 86 can be positioned to extend along a portion of the seal ramp 60 to define an area of reduced or minimal surface texture along the outer circumference of the seal ring 10 that is directly adjacent to the frictional load surface 12 and proximate to the seal flange 42. In particular, in one embodiment, the first end 90 of the frictional load surface 12 can be positioned at or adjacent to the first or inner radial end 66 of the seal ramp 60, and additionally can be proximal to the first outer axial end 22 of the seal ring body 14. Accordingly, the first end 90 of the frictional load surface 12 can be proximate, directly adjacent, and, in one example, can be partially exposed to and/or in communication with the oil side portion 64 of the outer circumferential profile 56 of the seal ring body 14. The second end 92 of the frictional load surface 12 can be positioned axially along the seal ramp 60 between the first end 90 of the frictional load surface 12 and the second end 68 of the seal ramp 60, wherein the smooth surface 86 can define the remaining exterior axial surface 50 of the seal ramp 60 extending from the second end 92 of the frictional load surface 12 to the second or outer radial end 68 of the seal ramp 60. In one embodiment, the seal ramp 60 can additionally include a raised annular ridge 112 which can be formed as an upwardly extending protrusion which extends above and is positioned between the frictional load surface 12 as well as the smooth surface 86 of the seal ramp 60. In one example, the raised annular ridge 112 can define the second end 92 of the frictional load surface 12 as a protrusion that extends radially along the outer circumference of the seal ring 10, and thus can be positioned directly adjacent to the smooth surface 86 such that the raised annular ridge 112 forms a radial, upwardly extending barrier at the interface between the frictional load surface 12 and the smooth surface 86 of the seal ramp 60.

In one embodiment, the generally axially extending width 88 of the frictional load surface 12 can extend a distance along the cross sectional profile 16 of the seal ring body 14 from the first end 90 of the frictional load surface 12, which can be at or adjacent to the first or inner radial end 66 of the seal ramp 60 consistent with the foregoing discussion, to the second end 92 of the frictional load surface 12, wherein the generally axially extending width 88 of the frictional load surface 12 can be between 35 and 75 percent of the overall generally axially extending width 61 of the seal ramp 60. In an alternate or additional embodiment, the generally axially extending width 88 of the frictional load surface 12 can extend a distance along the cross sectional profile 16 of the seal ring body 14 from the first end 90 of the frictional load surface 12, which can be at or adjacent to the first or inner radial end 66 of the seal ramp 60 consistent with the foregoing discussion, to the second end 92 of the frictional load surface 12 which may be positioned at or proximate to a midpoint 114 of the seal ramp 60. Furthermore, the smooth surface 86 can have a generally axially extending width 116 which extends from the second end 92 of the frictional load surface 12 to the second or outer radial end 68 of the seal ramp 60.

In one exemplary embodiment, which may be additional to and/or include one or more of the embodiments discussed above and herein, the frictional load surface 12 is not only positioned with the first end 90 thereof at or adjacent to the first or inner radial end 66 of the seal ramp 60, proximal to the first outer axial end 22 of the seal ring body 14, and directly adjacent to the oil side portion 64, but also extends a predefined, generally axially extending width 88 along a portion of the seal ramp 60 such that all or a substantial portion of the frictional load surface 12 and a portion 118 of the smooth surface 86 of the seal ramp 60 directly adjacent to the second end 92 of the frictional load surface 12 form an elastomeric seal interface surface 120. In particular, and as further illustrated in the exemplary embodiment of a seal assembly 128 illustrated in FIG. 6 and FIG. 7, the generally axially extending width 88 of the frictional load surface 12 can extend along the outer circumferential profile 56 of the seal ramp 60 from the first end 90 to the second end 92 of the frictional load surface 12 at a predetermined, general axially extending distance as a ratio or percentage of a contact width 122 between the elastomeric seal 124 and the exterior axial surfaces 50 of the seal ramp 60 when compressed into contact therewith along the elastomeric seal interface surface 120. As such, the contact width 122 can be defined as a generally axially extending width of the elastomeric seal interface surface 120, and in one embodiment includes all or a substantial portion of the axially extending width 88 of the frictional load surface 12 (positioned adjacent to the oil side portion 64 of the outer circumferential profile 56 of the seal ring body 14, and accordingly, the elastomeric seal interface surface 120) in addition to a generally axially extending width of the portion 118 of the smooth surface 86 of the seal ramp 60 directly adjacent to the second end 92 of the frictional load surface 12 (positioned adjacent to the air side portion 84 of the outer circumferential profile 56 of the seal ring body 14, and accordingly, the elastomeric seal interface surface 120), which together form the elastomeric seal interface surface 120. In one embodiment, the generally axially extending width 88 of the frictional load surface 12 with reference to the percentage of the contact width 122 between a surface of the elastomeric seal 124 when elastomerically and/or resiliently compressed into mating contact along the length of the elastomeric seal interface surface 120 can be defined as a ratio or percentage between the generally axially extending width 88 of the frictional load surface 12 and a diameter 126 of an elastomeric seal 124 in an uncompressed state, as shown in FIG. 6. In particular, the generally axially extending width 88 of the frictional load surface 12 can be sized (and positioned) as a ratio or percentage of a diameter 126 of an elastomeric seal 124 in an uncompressed state such that a surface of the elastomeric seal 124, when compressed into contact with the seal ramp 60 along the contact width 122 of the elastomeric seal interface surface 120, is in mating contact with all or a substantial portion of the axially extending width 88 of the frictional load surface 12 as well as an adjacent portion 118 of the smooth surface 86, as discussed above, wherein in one example, the generally axially extending width 88 of the frictional load surface 12 can be between 35 and 75 percent of the diameter 126 of the elastomeric seal 124. As provided above, the remaining portion of the smooth surface 86 which extends beyond the elastomeric seal interface surface 120 to the second end 68 of the seal ramp 60, as well as the one or more inner radial surfaces 70 and the outer axial surface 74 of the seal flange 42 can accordingly represent an air side portion 84 of the outer circumferential profile 56 of the seal ring body 14 which is exposed to the outside environment.

A number of different processes and methods can be utilized, in whole and/or in part, to fabricate the presently disclosed seal ring 10. In one embodiment, the presently disclosed seal ring 10 can be a die formed seal ring 10 fabricated from a sheet of metal or other durable material suitable for forming. In one example, the presently discussed die formed seal ring 10 is fabricated from a sheet of 400 series hardenable stainless steel, which can be subjected to one or more forming operations via introduction to one or more presses to produce the presently disclosed die formed seal ring 10. In another embodiment, the presently disclosed seal ring 10 can be a die formed seal ring 10 fabricated from a sheet of SAE 1074 steel, or alternatively, can be fabricated from any other steel or other metal material or alloy suitable for forming. In one particular example, the sheet of metal is a continuous sheet of metal in coil form which can be fed into the first of a plurality of die stations as discussed herein, or additionally, or alternatively, the sheet of metal is fed into one or more die stations of a progressive stamping die as a continuous sheet from a coil. As such, as discussed herein, the term "sheet of metal" can be defined as either a single sheet of metal or can equally be defined as a "sheet or coil form" as fed from a coil as provided above.

A plurality of die stations can be utilized to form the sheet of metal into the finished, die formed seal ring 10 including any one or more of the features as disclosed above and herein. The plurality of die stations can be incorporated as a single progressive stamping die and mounted within a reciprocating stamping press such that the sheet of metal is subjected to a sequence of progressive operations including but not limited to blanking, stamping, coining, drawing, ironing, bending, and other forming operations provided by the plurality of stations included in the progressive stamping die to form the presently disclosed seal ring 10. Alternatively, one or more of the plurality of die stations and foregoing forming operations can be provided and performed by one or more separate dies mounted within one or more separate presses. Notwithstanding, in any embodiment wherein the presently disclosed seal ring 10 is a die formed seal ring 10, the cross sectional profile 16 of the seal ring body 14 can be formed as a substantially solid, unitary die-formed body wherein the generally axially extending portion 38 thereof can have a substantially consistent and uniform thickness 54 extending throughout the axial width 26 between the first outer axial end 22 and the second outer axial end 24 of the cross sectional profile 16 of the seal ring body 14. Additionally, in one embodiment, the generally radially extending portion 40 of the die formed seal ring body 14 can also have a substantially consistent and uniform thickness 75 throughout the radial length of the generally radially extending portion 40 extending outwardly along and/or adjacent to the second outer axial end 24 of the seal ring body 14 from the generally axially extending portion 38 to the outer radial end 32 of the seal ring body 14 and the outer diameter 36 of the seal ring 10. Furthermore, in one example, the thickness 54 of the generally axially extending portion 38 can be substantially consistent with and generally equivalent to the thickness 75 of the generally radially extending portion 40 such that the cross sectional profile 16 of the seal ring body 14 is formed as a substantially solid, unitary, die-formed body having a substantially consistent, uniform thickness extending along and throughout the cross sectional profile 16 thereof.

In an additional embodiment, one or more of the die stations can be configured to impart one or more of the features of the frictional load surface 12 into the seal ring body 14 of the seal ring 10, including but not limited to the surface texture 94 of the frictional load surface 12, the surface roughness thereof, the textured pattern 98 of grooves or channels 96 (which can include the cavities 108 and raised ridges 106 thereof), and/or the raised annular ridge 112 and additionally can be configured to form the seal ring body 14 as including the smooth surface 86 consistent with any one or more of the embodiments disclosed above and herein. These surface forming die stations can be included as one or more separate die stations or can be included or combined with one or more of the blanking, stamping, coining, drawing, ironing, bending, and/or other forming dies and/or operations which can form the presently disclosed seal ring 10. In particular, one or more dies or die stations can have a die surface sized, shaped, textured and/or positioned to be substantially consistent with the size, shape, and position of the frictional load surface 12 on the finished, die formed seal ring 10 consistent with any one or more of the embodiments disclosed herein and can be bead blasted, shot blasted, or phosphate coated, and additionally, or alternatively, can have a textured pattern as well as any additional corresponding structures and/or surfaces to impart any one or more of the surface roughness, surface texture 94, textured pattern 98 of grooves or channels 96 (which can include the cavities 108 and raised ridges 106 thereof), and/or the raised annular ridge 112 of the frictional load surface 12 onto the surface the seal ring body 14 of the seal ring 10. Additionally, in one embodiment, all or a portion of the foregoing surface texture imparting die surfaces of the one or more dies or die stations can be provided as removable and/or replaceable inserts within the one or more dies of the one or more die stations.

In one example, one or more stamping or coining dies can include a die surface or surfaces as disclosed above which are sized, shaped, textured and/or positioned to form, stamp, or otherwise impress any one or more of the foregoing features of the frictional load surface 12 and additionally, or alternatively, those of the smooth surface 86 into the flat sheet of seal ring material during the fabrication process, which can be subsequent to or combined with a blanking operation, and in one embodiment can be prior to forming or drawing operations. In an embodiment wherein one or more of the foregoing features are formed into the flat sheet of seal ring material prior to forming or drawing operations, the surface texture imparting die surface or surfaces can be sized, shaped, positioned and/or otherwise configured to account for subsequent stamping, forming, and/or drawing steps and any material deformations caused thereby such that the features formed, stamped, or otherwise impressed into the material are appropriately positioned and imparted to the finished, die formed seal ring 10 in accordance with the any one or more of the embodiments disclosed herein.

Alternatively, surface texture imparting die surfaces or operations, including any one or more that form any one or more of the surface roughness, surface texture 94, and/or textured pattern 98 of grooves or channels 96 (which can include the cavities 108 and raised ridges 106 thereof), and/or the raised annular ridge 112 of the frictional load surface 12 and/or the smooth surface 86 consistent with the present disclosure can be performed and incorporated into forming and/or drawing operations. In one embodiment, any one or more or a combination of the surface forming die surfaces can be compressed into a surface of the sheet of seal ring material as the material is drawn, formed, stretched or otherwise compressed or deformed into a predefined shape by a die surface, mold, or punch from the opposite side thereof. In another embodiment, any one or more of the foregoing surfaces and/or features of the frictional load surface 12 and/or those of the smooth surface 86 can be incorporated as a separate, targeted pressing, forming, and/or ironing operation subsequent to a forming and/or drawing operation. In yet another alternative, the surface roughness, surface texture 94, and/or textured pattern 98 of grooves or channels 96 can be formed into the seal ring body 14 of a substantially finished, die formed seal ring 10 via a rolling operation. In yet another embodiment, any one or more of the foregoing surfaces and/or features of the frictional load surface 12 and/or those of the smooth surface 86 can be formed into the seal ring body 14 of a substantially finished, die formed seal ring 10 via one or more subsequent machining or any other known processes or operations.

In yet another embodiment, the presently disclosed seal ring 10 can be a cast seal ring 10 fabricated from steel or other metal material or alloy thereof suitable for manufacturing the seal ring 10 of the present disclosure via any one or more suitable casting operations or processes. In one example, the foregoing features of the frictional load surface 12 as well as the smooth surface 84 can be included as corresponding structures and/or surfaces imparted to the casting mold to form a finished, cast seal ring 10 with features consistent with any one or more of the embodiments as disclosed herein. In particular, a correspondingly positioned negative of the desired features of the frictional load surface 12, including but not limited to the surface texture 94, and/or textured pattern 98 of grooves or channels 96 (which can include the cavities 108 and raised ridges 106 thereof), and/or the raised annular ridge 112 of the frictional load surface 12 can be formed within the mold to impart the corresponding features into the as-molded, finished cast seal ring 10 consistent with any one or more of the embodiments disclosed herein. Additionally, or alternatively, one or more surfaces of the mold including but not limited to those that form the frictional load surface 12 and the smooth surface 86 can include an in-mold surface texture configured to impart the corresponding surface roughnesses and/or textures of the frictional load surface 12 and the smooth surface 86, wherein the in-mold surface textures can be formed by the selection or conditioning of the mold material, which one example can be via the selection, placement and/or conditioning of different coarsenesses of sand or particulate material from which the mold can be fabricated. In yet another alternative, the surface roughness, surface texture 94, and/or textured pattern 98 of grooves or channels 96 can be formed into the seal ring body 14 of a substantially finished, cast seal ring 10 via a rolling operation. In yet another embodiment, any one or more of the foregoing surfaces and/or features of the frictional load surface 12 and/or those of the smooth surface 86 can be formed into the seal ring body 14 of a substantially finished, cast seal ring 10 via one or more subsequent machining or any other known processes or operations. Alternatively, the surface roughness, surface texture 94, and/or textured pattern 98 of grooves or channels 96 can be formed into the seal ring body 14 of a substantially finished, cast seal ring 10 via a rolling operation.

In yet another embodiment, the presently disclosed seal ring 10 can be formed, in whole or in part, by one or more forging operations, and as such, can be composed of any metal such as steel or alloy thereof suitable for forging. Additionally, in an embodiment wherein the seal ring 10 of the present disclosure is fabricated as a forged seal ring 10, one or more forging operations and associated tooling, such as one or more dies, can include one or more surfaces which are sized, shaped, textured and/or positioned to form, stamp, impress or otherwise impart one or more of the features of the frictional load surface 12 into the seal ring body 14 of the seal ring 10, including but not limited to the surface texture 94 of the frictional load surface 12, the surface roughness thereof, the textured pattern 98 of grooves or channels 96 (which can include the cavities 108 and raised ridges 106 thereof), and/or the raised annular ridge 112 and additionally can be configured to form the seal ring body 14 as including the smooth surface 86 consistent with any one or more of the embodiments disclosed above and herein. The one or more forging operations and associated tooling configured to impart the foregoing associated features, surfaces, and/or surface textures of the frictional load surface 12 and the smooth surface 96 can be performed and/or incorporated into one or more separate or combined forging operations and associated tooling, and additionally, or alternatively, can be separate from or combined with one or more forging operations and associated tooling configured to impart the additional features of the presently disclosed seal ring 10. In one example of the present embodiment, upon completion of the one or more forging operations including but not limited to those configured to impart all or a part of any one or more of the foregoing surfaces and/or features of the frictional load surface 12 and/or those of the smooth surface 86, the substantially finished, forged seal ring 10 can be subjected to subsequent machining and/or finishing operations configured to impart one or more features, dimensions, shapes and/or surfaces to the forged seal ring 10 which may not have been imparted to the seal ring 10 via the prior one or more forging operations.

Alternatively, the seal ring 10 with a frictional load surface 12 as disclosed herein can be made from metal or any suitable hard, durable material, and can be formed by any other suitable, known fabrication process.

An exemplary embodiment of a seal assembly 128 is illustrated in FIG. 6. In particular, the illustrated seal assembly 128 includes a seal ring 10 with a frictional load surface 12 which is substantially identical and includes features which are consistent with any of the embodiments as provided above and as further disclosed herein, and additionally includes an elastomeric seal 124. The elastomeric seal 124 can be an annular, ring-shaped member having a substantially consistent, circular cross sectional profile which extends radially and circumferentially at a constant radially offset distance around a center longitudinal axis 130 of the seal assembly 128, which is coaxially aligned with the center longitudinal axis 18 of the seal ring 10, to define the elastomeric seal 124 as an O-ring or torus. The elastomeric seal 124 can be formed of any suitable compressible, resilient elastomeric material, including but not limited to nitrile, hydrogenated nitrile, silicone, or fluoroelastomer, and can have a substantially consistent, circular cross sectional diameter 126 throughout the radial circumference of the elastomeric seal 124 in an uncompressed state In order to form the seal assembly 128, in one embodiment, the elastomeric seal 124 can be rotatably mounted, rolled, slid, or otherwise inserted over the first outer axial end 22 of the seal ring body 14, past the seal retaining lip 62 and over one or more exterior axial surfaces 50 of the axially extending collar 58 and positioned at a final, assembled position, contacting one or more of the exterior axial surfaces 50 of the seal ramp 60. In particular, in one embodiment, in the final, assembled position, of the seal assembly 128 the elastomeric seal 124 is positioned to be elastomerically and/or resiliently biased and contacting, at least in part, the outer, axial frictional load surface 12 of the seal ramp 60 such that, in a loaded or otherwise deformed state as shown in FIG. 7, the elastomeric seal 124 is positioned to contact, in part, the exterior axial surfaces 50 of the seal ramp 60 along the elastomeric seal interface surface 120 which can include substantially all of the frictional load surface 12 positioned at, adjacent, and/or proximate to the first or inner radial end 66 of the seal ramp 60 and a portion 118 of the smooth surface 86 of the seal ramp 60 directly adjacent to the second end 92 of the frictional load surface 12.

An exemplary embodiment of a sealed rotating assembly 132 which can form, in part, a machine, machine system, mechanical system and/or a component thereof is illustrated in FIG. 7. The sealed rotating assembly 132 can include one or more seal assemblies 128 which can each include a seal ring 10 with a frictional load surface 12 and an elastomeric seal 124. The sealed rotating assembly 132 as contemplated by the present disclosure can be any assembly which can utilize a seal ring 10 and at least one seal ring assembly 128 for use in any machine, machine system, mechanical system and/or a component thereof having relatively rotating components, including but not limited to machine drive train assemblies, track roller and/or idler assemblies of tracked machines, final drives, hinge joints, etc, rotary cutter assemblies and/or earth-boring rotary drill bits such as those utilized in tunnel boring machines, rotatable and/or pivotal joint assemblies for linkages of machines such as wheel loaders, backhoes, excavators, material handlers and the like.

For the purposes of the present disclosure, by way of example and not by way of limitation, a sealed rotating assembly can 132 include a set of substantially identical first and second seal assemblies 134, 136, each including a seal ring 10 with a frictional load surface 12 and an elastomeric seal 120 consistent with any of the embodiments as provided above and as further disclosed herein, wherein each of the first and second seal assemblies 134, 136 are additionally each substantially identical to seal assembly 128. The first seal assembly 134 can be disposed, at least in part, within a first seal cavity 138 of a first housing 140 of the sealed rotating assembly 132 and the second seal assembly 136 can be disposed, at least in part, within a second seal cavity 142 of a second housing 144 of the sealed rotating assembly 132. Furthermore, the first seal cavity 138 is substantially identical to the second seal cavity 142, and therefore, it should be understood that the description of one seal assembly is equally applicable to the other seal assembly, and similarly, the description of one seal cavity is equally applicable to the other seal cavity. Additionally, for the purposes of illustration, first and second seal assemblies 134, 136 each disposed within a first and second seal cavity 138, 142, respectively, are discussed. However, the scope of the present disclosure is not intended to be limited thereby, as in other embodiments, such as in those where the particular configuration, application, and/or environment in which the sealed rotating assembly 132 is employed may so warrant, the sealed rotating assembly 132 can include one or more rotatable and/or fixed housings which can employ one or more single, or first seal assemblies 134 each disposed, at least in part, within a single, or first seal cavity 138 of a first housing 140 such that each single, or first seal assembly 134 sealingly engages and acts as a gasket to provide a fluid-tight seal, in part, between the single, or first seal cavity 138 of the first housing 140 and an adjacent surface of a second housing 144.

In one exemplary embodiment of the present disclosure as illustrated in FIG. 7, a sealed rotating assembly 132 can include a first housing 140 and a second housing 144 as well as an internal shaft or pin 146 having a center longitudinal axis 148. The first housing 140 and the second housing 144 can each be coaxial with reference to the center longitudinal axis 148 of the internal shaft or pin 146 and can be arranged in adjacent, axially offset relation to each concentrically surround the exterior circumferential surface of the internal shaft or pin 146. In one embodiment, the first housing 140 can be a stationary housing and can be fixedly attached to a frame of a machine or component of a machine system. The first housing 140 can additionally be spaced from the exterior circumferential surface of the internal shaft or pin 146 by an internal, axially extending annular gap or clearance 150 adapted to be filled and/or in communication with lubricant fluid 152 such as oil. The second housing 144 can be pivotal or rotatable about the center longitudinal axis 148 relative to the first housing 140 as well as the internal shaft or pin 146. In particular, the second housing 144 can be pivotally and/or rotatably supported by internal bearing surfaces (not shown) of the sealed rotating assembly 132 and concentrically spaced from the exterior circumferential surface of the internal shaft or pin 146 by the internal, axially extending annular gap or clearance 150 adapted to be filled with lubricant fluid 152 such as oil for lubricating the internal pivotal and/or rotatable interface surfaces and bearing surfaces of the sealed rotating assembly 132. In an alternative or additional embodiment, the first housing 140 and the second housing 144 can each be pivotally and/or rotatably supported by internal bearing surfaces such that each of the first housing 140 and second housing 144 are mutually and independently pivotal and/or rotatable about the center longitudinal axis 148 relative to the internal shaft or pin 146.

In one embodiment the first housing 140 can have at least one radial end wall 154 having one or more outer, radially extending surfaces 158 which can extend circumferentially around the internal shaft or pin 146, and similarly, the second housing 144 can have at least one radial end wall 156 having one or more outer, radially extending surfaces 160 which can extend circumferentially around the internal shaft or pin 146. A radially extending gap 162 can separate the first housing 140 from the second housing 144 and can be defined as a clearance between a radial end wall 156 of the second housing 144 and an adjacent, axially offset, and facing radial end wall 154 of the first housing 140. The radially extending gap 162, in conjunction with the internal, axially extending annular gap or clearance 150 and internal bearing surfaces, can facilitate the independent pivotal and/or rotational relative movement between the second housing 144 and/or the first housing 140 with reference to the internal shaft or pin 146.

In order accommodate the first seal assembly 134 and the second seal assembly 136, the first seal cavity 138 can be formed in the radial end wall 154 of the first housing 140, and the second seal cavity 142 can be formed in the adjacent, axially offset, and facing radial end wall 156 of the second housing 144, wherein the first seal cavity 138 of the first housing 140 is aligned in axially, symmetrically and circumferentially offset relation with the second seal cavity 142 of the second housing 144 on each side of the radially extending gap 162. In particular, in one embodiment, the first seal cavity 138 can be an annular recess which is formed to extend axially into the interior of the first housing 140, wherein the first seal cavity 138 can be positioned radially between the outer, radially extending surfaces 158 of the radial end wall 154 of the first housing 140 and the axially extending annular gap or clearance 150 which is proximal to the exterior circumferential surface of the internal shaft or pin 146. The radially extending gap 162 as well as the outer, radially extending surfaces 158 of the radial end wall 154 of the first housing 140 (and similarly the outer, radially extending surfaces 160 of the radial end wall 156 of the second housing 144) can be exposed and/or in communication with an outside environment of the sealed rotating assembly 132 as well as dust, dirt, debris, mud, moisture or any other foreign matter 164 therefrom. Additionally, consistent with the foregoing, the axially extending annular gap or clearance 150 surrounding the exterior circumferential surface of the internal shaft or pin 146 can define, at least in part, an inner, lubricant fluid 152 filled environment of sealed rotating assembly 132. Similarly, the second seal cavity 142 can be an annular recess which is formed to extend axially into the interior of the second housing 144 and can be positioned radially between the outer, radially extending surfaces 160 of the radial end wall 156 of the second housing 144, which can be exposed and/or in communication with an outside environment of the sealed rotating assembly 132, and the axially extending annular gap or clearance 150 including the inner, lubricant fluid 152 filled environment of sealed rotating assembly 132.

In one embodiment, the first seal cavity 138 can be defined, in part, as including one or more interior axial surfaces 166 which face and/or are generally oriented toward the center longitudinal axis 148 of the internal shaft or pin 146 and extend generally axially and in interconnected fashion from an inner, radial end 168 of the outer, radially extending surfaces 158 of the radial end wall 154 of the first housing 140 an to inner axial end 172 of the first seal cavity 138. The one or more interior axial surfaces 166 of the first seal cavity 138 can include an elastomeric seal contact surface 176 and in one embodiment, can also include one or more surfaces 166 which define a housing lip 180. The elastomeric seal contact surface 176 can be inclined at an increasing or positive angle with reference to and outward and away from the center longitudinal axis 148 of the inner shaft or pin 146 as the elastomeric seal contact surface 176 extends from the inner axial end 172 of the first seal cavity 138 to an outer radial end 184 of the elastomeric seal contact surface 176. As such, in one example, the inner axial end 172 of the first seal cavity 138 can represent an inner end of the elastomeric seal contact surface 176 which is radially proximal to the center longitudinal axis 148 of the inner shaft or pin 146 and can be in communication with the lubricant fluid 152, such as oil, of the inner, lubricant filled environment of the sealed rotating assembly 132. Additionally, the outer radial end 184 of the elastomeric seal contact surface 176 can represent an end of the elastomeric seal contact surface 176 which is radially distal to the center longitudinal axis 148 of the inner shaft or pin 146 and axially proximal to the outer, radially extending surfaces 158 of the radial end wall 154 of the first housing 140 as well as the radially extending gap 162. The housing lip 180 can be positioned to extend between the outer radial end 184 the elastomeric seal contact surface 176 and the inner, radial end 168 the radial end wall 154 of the first housing 140. In one embodiment, the housing lip 180 can include one or more contoured and/or angled surfaces 166 which protrude or extend radially inward toward the center longitudinal axis 148 of the inner shaft or pin 146 as the housing lip 180 extends from the outer radial end 184 of the elastomeric seal contact surface 176 to the to the inner, radial end 168 of the outer, radially extending surfaces 158 of the radial end wall 154 of the first housing 140.

In a similar fashion and substantially consistent with the first seal cavity 138 of the first housing 140 as discussed above, the second seal cavity 142 can similarly be defined, in part, as including one or more interior axial surfaces 167 which face and/or are generally oriented toward the center longitudinal axis 148 of the internal shaft or pin 146 and extend generally axially in interconnected fashion from an inner, radial end 170 of the outer, radially extending surfaces 160 of the radial end wall 156 of the second housing 144 an to inner axial end 174 of the second seal cavity 142. The one or more interior axial surfaces 167 of the second seal cavity 142 can similarly include an elastomeric seal contact surface 178 and a housing lip 182. The elastomeric seal contact surface 178 can be inclined at an increasing or positive angle with reference to and outward and away from the center longitudinal axis 148 of the inner shaft or pin 146 as the elastomeric seal contact surface 178 extends from the inner axial end 174 of the second seal cavity 142, which can be radially proximal to the center longitudinal axis 148 and can be in communication with the lubricant fluid 152, to an outer radial end 186 of the elastomeric seal contact surface 178, which can be radially distal to the center longitudinal axis 148 of the inner shaft or pin 146 and axially proximal to the outer, radially extending surfaces 160 of the second housing 144 as well as the radially extending gap 162. The housing lip 182 can include one or more contoured and/or angled surfaces 167 which protrude or extend radially inward toward the center longitudinal axis 148 of the inner shaft or pin 146 as the housing lip 182 extends from the outer radial end 186 of the elastomeric seal contact surface 178 to the to the inner, radial end 170 of the outer, radially extending surfaces 160 of the radial end wall 156 of the second housing 144.

At least a portion of the first seal assembly 134 can be disposed within the first seal cavity 138 and at least a portion of second seal assembly 136 can be disposed within the second seal cavity 142 to each circumferentially surround the exterior circumferential surface of the internal shaft or pin 146 in coaxial, radially spaced relation therefrom with the center longitudinal axes (such as 130, as provided above) of the first and second seal assemblies 134, 136 coaxially aligned with the center longitudinal axis 148 of the internal shaft or pin 146. Additionally, at least a portion of the generally radially extending portion 40 of the seal ring body 14 of each of the first seal assembly 134 and the second seal assembly 136 can be positioned to extend out of each respective seal cavity 138, 142 and into the radially extending gap 162 in symmetrical, coaxial and contacting alignment. In particular, the generally axially extending portion 38 of the seal ring body 14 of the first seal ring assembly 134 can be disposed within the first seal cavity 138 with the exterior axial surfaces 50 of the seal ring body 14 oriented to face the interior axial surfaces 166 of the first seal cavity 138. Similarly, the generally axially extending portion 38 of the seal ring body 14 of the second seal assembly 136 can be disposed within the second seal cavity 142 with the exterior axial surfaces 50 of the seal ring body 14 oriented to face the interior axial surfaces 167 of the second seal cavity 142. The generally radially extending portion 40 of the seal ring body 14 of the first seal assembly 134 can extend outward from the first seal cavity 138 such that the seal flange 42 is positioned as extending radially within the radially extending gap 162, with the second outer axial, or sealing end 24 of the seal ring 10, as well as the seal face surface 76 thereof, oriented proximal to and facing the second housing 144. Similarly, the generally radially extending portion 40 of the seal ring body 14 of the second seal assembly 136 can extend outward from the second seal cavity 142 such that the seal flange 42 is positioned as extending radially within the radially extending gap 162, with the second outer axial, or sealing end 24 of the seal ring 10, as well as the seal face surface 76 thereof, not only oriented proximal to and facing the first housing 140, but also aligned in abutting, face-to-face, sealing contact with the seal face surface 76 of the seal ring body 14 of the first seal ring assembly 134.

In one embodiment, the inclined exterior axial surfaces 50 of the seal ramp 60 of the seal ring body 14 of the first seal assembly 134, with the elastomeric seal 124 positioned thereupon, are positioned in facing and in adjacent, substantially offset alignment with the inclined, interior elastomeric seal contact surface 176 of the first seal cavity 138 such that the elastomeric seal 124 is resiliently and/or elastomerically compressed between the inclined exterior axial surfaces 50 of the seal ramp 60 of the seal ring body 14 and the inclined, interior elastomeric seal contact surface 176 of the first seal cavity 138. In this position, which can represent the final, assembled position of the first seal assembly 134 within the first seal cavity 138, the elastomeric seal 124 can be resiliently and/or elastomerically compressed into sealing contact with the elastomeric seal interface surface 120 of the seal ring body 14 of the first seal assembly 134 which can include substantially all of the frictional load surface 12, which can be positioned at or adjacent to the first or inner radial end 66 of the seal ramp 60 and proximal to the first outer axial end 22 of the seal ring body 14, as well as a portion 118 of the smooth surface 86 of the seal ramp 60 directly adjacent to the second end 92 of the frictional load surface 12. Additionally, the elastomeric seal 124 can be resiliently and/or elastomerically compressed into sealing contact with a substantially corresponding, opposing portion of the interior circumferential elastomeric seal contact surface 176 of the first seal cavity 138 which is positioned between the inner axial end 172 of the first seal cavity 138, which can be in communication with the lubricant fluid 152, such as oil, of the inner, lubricant filled environment of the sealed rotating assembly 132, and the outer radial end 184 of the elastomeric seal contact surface 176, which can be exposed and/or in communication with an outside environment of the sealed rotating assembly 132 as well as dust, dirt, debris, mud, moisture or any other foreign matter 164 therefrom. Accordingly, the exterior axial surfaces 50 of the seal ring body 14 positioned between the first end 90 of the frictional load surface 12 (as well as the elastomeric seal interface surface 120) and the first outer axial end 22 of the seal ring body 14 can be defined as the oil side portion 64 of the outer circumferential profile 56 of the seal ring body 14 of the first seal assembly 134 exposed to or in communication with the lubricant fluid 152 of the inner, lubricant filled environment of sealed rotating assembly 132. Furthermore, the remaining portion of the smooth surface 86 which extends beyond the smooth surface 86 portion 116 of the elastomeric seal interface surface 120 to the second or outer radial end 68 of the seal ramp 60, as well as the one or more inner radial surfaces 70 and the outer axial surface 74 of the seal flange 42 can thus represent the air side portion 84 of the outer circumferential profile 56 of the seal ring body 14 of the first seal assembly 134 which is exposed to the outside environment of the sealed rotating assembly 132 as well as dust, dirt, debris, mud, moisture or any other foreign matter 164 therefrom.

In a similar manner, the inclined exterior axial surfaces 50 of the seal ramp 60 of the seal ring body 14 of the second seal assembly 136, with the elastomeric seal 124 positioned thereupon, are positioned in facing and in adjacent, substantially offset alignment with the inclined, interior elastomeric seal contact surface 178 of the second seal cavity 142 such that the elastomeric seal 124 is resiliently and/or elastomerically compressed between the inclined exterior axial surfaces 50 of the seal ramp 60 of the seal ring body 14 and the inclined, interior elastomeric seal contact surface 178 of the second seal cavity 142. In this position, which can represent the final, assembled position of the second seal assembly 136 within the second seal cavity 142, the elastomeric seal 124 can be resiliently and/or elastomerically compressed into sealing contact with the elastomeric seal interface surface 120 of the seal ring body 14 of the second seal assembly 136, which can include substantially all of the frictional load surface 12, which can be positioned at or adjacent to the first or inner radial end 66 of the seal ramp 60 and proximal to the first outer axial end 22 of the seal ring body 14, as well as a portion 118 of the smooth surface 86 of the seal ramp 60 directly adjacent to the second end 92 of the frictional load surface 12. Additionally, the elastomeric seal 124 can be resiliently and/or elastomerically compressed into sealing contact with a substantially corresponding, opposing portion of the interior, circumferential elastomeric seal contact surface 178 of the second seal cavity 142 which is positioned between the inner axial end 174 of the second seal cavity 142, which can be in communication with the lubricant fluid 152, such as oil, of the inner, lubricant filled environment of the sealed rotating assembly 132, and the outer radial end 186 of the interior, circumferential elastomeric seal contact surface 178, which can be exposed and/or in communication with an outside environment of the sealed rotating assembly 132 as well as dust, dirt, debris, mud, moisture or any other foreign matter 164 therefrom. Accordingly, the exterior axial surfaces 50 of the seal ring body 14 of the second seal assembly 136 positioned between the first end 90 of the frictional load surface 12 (as well as the elastomeric seal interface surface 120) and the first outer axial end 22 of the seal ring body 14 can be defined as an oil side portion 64 of the outer circumferential profile 56 of the seal ring body 14 of the second seal assembly 136 exposed to or in communication with the lubricant fluid 152 of the inner, lubricant filled environment of sealed rotating assembly 132. Furthermore, the remaining portion of the smooth surface 86 which extends beyond the smooth surface 86 portion 116 of the elastomeric seal interface surface 120 to the second or outer radial end 68 of the seal ramp 60, as well as the one or more inner radial surfaces 70 and the outer axial surface 74 of the seal flange 42 can thus represent an air side portion 84 of the outer circumferential profile 56 of the seal ring body 14 of the second seal assembly 136 which is exposed to the outside environment of the sealed rotating assembly 132 as well as dust, dirt, debris, mud, moisture or any other foreign matter 164 therefrom.

Additionally, in one embodiment, the resilient and/or elastomeric compression of the elastomeric seal 124 of the first seal assembly 134 between the opposing, substantially aligned and facing inclined surfaces of the internal, circumferential elastomeric seal contact surface 176 of the first seal cavity 138 and the inclined exterior axial surfaces 50 of the elastomeric seal interface surface 120 of the seal ramp 60 of the seal ring body 14 of the first seal assembly 134 can apply an outward, radial load with reference to the center longitudinal axis 148 of the internal shaft or pin 146 in the direction indicated by the arrow shown in FIG. 7 and designated with reference numeral 188. In a like manner, the resilient and/or elastomeric compression of the elastomeric seal 124 of the second seal assembly 136 between the inclined internal, circumferential elastomeric seal contact surface 178 of the second seal cavity 142 and the inclined exterior axial surfaces 50 of the elastomeric seal interface surface 120 of the seal ramp 60 of the seal ring body 14 of the second seal assembly 136 can apply an outward, radial load with reference to the center longitudinal axis 148 of the internal shaft or pin 146 in the direction indicated by the arrow shown in FIG. 7 and designated with reference numeral 190. The outward, radial loads 188, 190 in the directions shown can maintain each seal assembly 134, 136 in an elastically supported, fixed state relative to and, in part, within the interior axial surfaces 166, 167 of the each seal cavity 138, 142 and each respective housing 140, 144. In particular, in one embodiment, the outward radial load 190 applied by the elastomeric seal 124 between the second seal assembly 136 and the second seal cavity 142 of the second housing 144 can transmit the rotational and/or pivotal movement of the second housing 144 to the second seal assembly 136 to rotate and/or pivot in unison therewith about the center longitudinal axis 148 of the internal shaft or pin 146 relative to the first seal assembly 134 and first housing 140. Similarly, the outward radial load 188 applied by the elastomeric seal 124 between the first seal assembly 134 and the first seal cavity 138 of the first housing 140 can maintain the first seal assembly 134 supported in fixed, non-rotatable/pivotable or stationary relation with reference to the first housing 140, or in some embodiments, can alternatively can transmit the rotational and/or pivotal movement of the first housing 140 to the first seal assembly 134 to rotate and/or pivot in unison therewith about the center longitudinal axis 148 of the internal shaft or pin 146 relative to the second seal assembly 136 and second housing 144. At the same time, the outward, radial loads 188, 190 in the directions shown can additionally maintain each elastomeric seal 124 in tight contact with each elastomeric seal interface surface 120, and accordingly, with each elastomeric seal contact surface 176, 178, to provide a fluid-tight seal between the air side portion 84 of the each seal assembly 134, 136 and seal cavity exposed 138, 142 to the outside environment, and an oil side portion 64 of each seal assembly 134, 136 and seal cavity 138, 142 exposed to or in communication with the lubricant fluid 152 of the inner, lubricant filled environment of sealed rotating assembly 132.

The resilient and/or elastomeric compression of each elastomeric seal 124 between the opposing, substantially aligned and facing inclined surfaces of the internal, circumferential elastomeric seal contact surfaces 176, 178 of the respective first and second seal cavities 138, 142 and the inclined exterior axial surfaces 50 of the elastomeric seal interface surfaces 120 of the seal ramps 60 of the annular seal ring bodies 14 of the respective first and second seal assemblies 134, 136 can additionally each apply a substantially equivalent, opposing axial load along the coaxially aligned center longitudinal axes (such as 130, as provided above) of the first and second seal assemblies 134, 136 and the center longitudinal axis 148 of the internal shaft or pin 146 in the directions indicated by the arrows shown in FIG. 7 and designated with reference numerals 192 and 194. In particular, the axial load 192 can resiliently bias or urge the seal flange 42 of the first seal assembly 134 and the outer, radially extending seal face surface 76 thereof axially toward and into abutting, face-to-face, sealing contact with the outer, radially extending seal face surface 76 of the seal ring body 14 of the second seal assembly 136. In a corresponding fashion, the axial load 194 can resiliently bias or urge the seal flange 42 of the second seal assembly 136 and the outer, radially extending seal face surface 76 thereof axially toward and into abutting, face-to-face, sealing contact with the outer, radially extending seal face surface 76 of the seal ring body 14 of the first seal assembly 134, to thus maintain a mutually and elastomerically biased, positive face seal along a radial, circumferential rotational interface surface 196 formed by the aligned, contacting circumferential surfaces of the annular sealing bands 80 of the relatively rotatable first and second seal assemblies 134, 136.

INDUSTRIAL APPLICABILITY

The seal ring 10 with a frictional load surface 12 of the present disclosure may be applicable to and incorporated in any seal assembly and additionally may be utilized in any sealed rotating assembly which can utilize a seal ring 10 and/or at least one seal ring assembly 128 consistent with any of the embodiments as provided above and as further disclosed herein. In addition to further advantages, the seal ring 10 with a frictional load surface 12 of the present disclosure may provide a stronger, more tenacious fluid-tight seal and provide increased resistance against rotational slippage between the presently disclosed seal ring, an elastomeric seal, as well as associated, interacting machine or mechanical system components. Additionally, the presently disclosed seal ring 10 with a frictional load surface 12 may reduce, minimize or substantially eliminate the accumulation of dust, dirt, debris, mud, moisture or any other foreign matter on the exterior surfaces of the seal ring. Furthermore, the seal ring 10 with a frictional load surface 12 of the present disclosure may reduce complexity and cost in fabrication and assembly.

Traditional, known seal rings may be susceptible to numerous failure modes, including but not limited to those related to debris packing and elastomeric seal slippage. Due to a variety of factors, any one or more of which may be present, the integrity of the abutting, sealing contact between surfaces of each seal assembly and those of the rotatable machine or mechanical system components may be compromised. As one example, dust, dirt, debris, mud, moisture or any other foreign matter may accumulate on surfaces of the seal assembly exposed to the outside environment, which may dislodge, displace, or otherwise interfere with the sealing contact between the elastomeric seal and the seal ring. Additionally, or alternatively, an inadequate degree of contact between the elastomeric seal and the seal ring, whether attributable to design factors, debris accumulation, or other factors, may permit lubricant such as oil to leak past the elastomeric seal and break the sealing contact between the elastomeric seal and the seal ring. In any event, the loss of sealing contact between the between the elastomeric seal and the seal ring may ultimately lead to slippage between the elastomeric seal and the seal ring, which may result in loss in seal face sealing load, lubricant contamination, seal face corrosion, or any other failure mode. Furthermore, known seal rings and/or seal assemblies may be characterized by complexity and expense in fabrication, and may additionally present difficulties, complexity and/or added cost in assembly and installation, including but not limited to configurations which may be designed to require or interact with specific, additional, and/or complimentary features or designs incorporated into the associated system or housing thereof into which the particular seal rings are installed. In addition to further advantages, the seal ring 10 with a frictional load surface 12 of the present disclosure may overcome disadvantages and/or reduce or substantially eliminate failure modes associated with traditional, known seal assemblies and seal rings utilized in connection therewith, including but not limited to those related to debris packing and elastomeric seal slippage, and may additionally reduce complexity and cost in fabrication and assembly.

In operation, as discussed above, in one example of a final assembled position, each elastomeric seal 124 of each associated seal assembly 134, 136 can be maintained in a loaded state and resiliently and/or elastomerically compressed, in part, into contact with surface texture 94 of the frictional load surface 12 of each associated seal ramp 60 which can be formed to include a predefined surface roughness. As a result, surface texture 94 which can be formed to include the predefined surface roughness can be positioned to engage the elastomeric seal 124 throughout the outer circumferential profile 56 of the seal ring 10 and provide increased contact stress and friction between the frictional load surface 12 and the mating surface of the elastomeric seal 124. In one embodiment, the surface texture 94 of the frictional load surface 12 (and surface roughness thereof) can be formed, at least in part, by a plurality of grooves or channels 96 which can form a textured pattern 98 of impressed or raised impressions which can further increase friction as well as the load required to spin or displace the elastomeric seal 124 relative to the frictional load surface 12. In one particular example, with the elastomeric seal 124 maintained in a loaded state and resiliently and/or elastomerically compressed, in part, in contact with the grooves or channels 96 of the textured pattern 98 of the frictional load surface 12, over a period of time, the compressible, resilient elastomeric material of the elastomeric seal 124 can flow into the surfaces or cavities 108 of the plurality of grooves or channels 96 as a result of the tendency of elastomeric materials under strain to take on the surface texture of the surface against which the elastomeric materials are paired, known as micro-scale compression set. Thus, the textured pattern 98 of the frictional load surface 12 can create a greater degree of static resistance between the elastomeric seal 120 and the textured pattern 98 of the frictional load surface 12, and, as a result, can provide increased traction for the elastomeric seal 120 to thereby increase the load required to spin or displace the elastomeric seal 120 relative to the frictional load surface 12 over time as a result of the micro-scale compression set between the resilient elastomeric material of the elastomeric seal 124 in mating contact with the textured pattern 98 of the frictional load surface 12. Additionally, in an embodiment wherein each of the plurality of grooves or channels 96 can be formed to include raised ridges 106, such as sharpened protrusions or burrs, which protrude outward from one or both sides of the cavities 108 impressed or otherwise formed into the frictional load surface 12 which define each groove or channel 96, the raised ridges 106 can frictionally engage the elastomeric seal 120 to provide an initial and additional degree of frictional, sealing contact between the compressible, resilient elastomeric material of the elastomeric seal 124 compressed into contact with the frictional load surface 12.

In one embodiment, the frictional load surface 12 can additionally be positioned to extend along a portion of the seal ramp 60 such that the elastomeric seal 124, when compressed into contact with the seal ramp 60, engages the textured pattern 98 of grooves or channels 96 of the frictional load surface 12 as a portion of the elastomeric seal interface surface 120 positioned directly adjacent to the oil side portion 64 of the outer circumferential profile 56 of the seal ring body 14. In addition to providing increased traction for the elastomeric seal 124 as provided above, positioning the textured pattern 98 of grooves or channels 96 of the frictional load surface 12 adjacent to the oil side portion 64 of the outer circumferential profile 56 of the seal ring body 14 may reduce, minimize, or substantially eliminate potential lubricant 152 leak paths and the likelihood of debris packing, and furthermore may provide an additional degree of resistance to slippage and loss of sealing contact between the seal ring 10 and the elastomeric seal 124. In particular, as provided above, the frictional load surface 12, and the textured pattern 98 thereof, can be positioned proximate to the first outer axial end 22 of the seal ring body 14 and can extend from a first end 90 which can be directly adjacent, and, in one example, can be partially exposed to and/or in communication with the oil side portion 64 of the outer circumferential profile 56 of the seal ring body 14 to a second end 92 along a portion of the seal ramp 60. In this position, the textured pattern 98 of the plurality of grooves or channels 96 can extend or can be positioned between the first end 90 and the second end 92 of the frictional load surface 12 to create a network and/or series of static fluid barriers which prevent lubricant fluid 152 from being fluidly transmitted, communicated or leaked from the first end 90 of the frictional load surface 12 and the oil side portion 64 of the outer circumferential profile 56 of the seal ring body 14 to the second end 92 of the frictional load surface 12, and subsequently to the air side portion 84 of the outer circumferential profile 56 of the seal ring body 14 to thereby compromise the fluid tight seal between the elastomeric seal 120 and surface texture 94 of the frictional load surface 12.

Additionally in one embodiment as provided above, the generally axially extending width 88 of the frictional load surface 12 can extend along the outer circumferential profile 56 of the seal ramp 60 from the first end 90 to the second end 92 of the frictional load surface 12 at a predetermined, general axially extending distance as a ratio or percentage of a contact width 122 of the elastomeric seal interface surface 120 such that the elastomeric seal 124, when compressed into contact with the seal ramp 60 along the contact width 122 of the elastomeric seal interface surface 120, is in mating contact with all or a substantial portion of the axially extending width 88 of the frictional load surface 12 as well as an adjacent portion 118 of the smooth surface 86. Furthermore, in one embodiment, the generally axially extending width 88 of the frictional load surface 12 can be between 35 and 75 percent of the overall generally axially extending width 61 of the seal ramp 60. In an alternative or additional embodiment, the generally axially extending width 88 of the frictional load surface 12 can be sized (and positioned) as a ratio or percentage of a diameter 126 of an elastomeric seal 124 in an uncompressed state, wherein the generally axially extending width 88 of the frictional load surface 12 can be between 35 and 75 percent of the diameter 126 of the elastomeric seal 124. Notwithstanding, in one embodiment, the generally axially extending width 88 of the frictional load surface 12 can be defined with reference to the width 61 of the seal ramp 60 and/or the diameter 126 of an elastomeric seal 124 and/or the contact width 122 of the elastomeric seal interface surface 120 such that the generally axially extending width 88 of the frictional load surface 12 forms and extends along at least half of the contact width 122 of the elastomeric seal interface surface 120, and in one example, is formed to extend along more than half and thus a greater portion or percentage of the contact width 122 of the elastomeric seal interface surface 120 than the generally axially extending width of the portion 118 of the smooth surface 86 included therein. Additionally, in one example, the generally axially extending width 88 of the frictional load surface 12, as well as the surface texture 94 in addition to the textured pattern 98 of grooves or channels 96 thereof can extend along and form half or more than half of the contact width 122 of the elastomeric seal interface surface 120 such that half or more of the contact width 122 of the elastomeric seal interface surface 120 is configured to frictionally and/or matingly contact the surface of the elastomeric seal 124 compressed into contact therewith and/or include a network of static barriers which can prevent lubricant fluid 152 from being fluidly transmitted, communicated or leaked from the first end 90 of the frictional load surface 12 and the oil side portion 64 of the outer circumferential profile 56 of the seal ring body 14.

Furthermore, in addition to providing more surfaces which are filled by the elastomeric seal 120 as a positive oil seal as a result of the micro-scale compression set between the resilient elastomeric material of the elastomeric seal 124 in mating contact with the textured pattern 98 of the frictional load surface 12, the network and/or series of static fluid barriers which may be formed by the textured pattern 98 of the plurality of grooves or channels 96 may account for and minimize the potential of lubricant fluid 152 leakage on account of contaminants within the lubricant fluid such as foreign matter 164 including dirt, debris, chips, and the like as well as manufacturing defects in portions of the textured pattern 98. Additionally, in some embodiments, the raised annular ridge 112 can define the second end 92 of the frictional load surface 12 as a protrusion that extends radially along the outer circumference of the seal ring 10, and thus can form a barrier at the interface between the frictional load surface 12 and the smooth surface 86 of the seal ramp 60 to further prevent lubricant fluid 152 from being fluidly communicated or leaked to the air side portion 84 of the outer circumferential profile 56 of the seal ring body 14 to thereby compromise the fluid tight seal between the elastomeric seal 120 and surface texture 94 of the frictional load surface 12.

As discussed above, in one embodiment, the frictional load surface 12 can be positioned to extend along a predefined, generally axially extending width 88 along a portion of the seal ramp 60 as a ratio or percentage of a contact width 122 between the elastomeric seal 124 and the elastomeric seal interface surface 120 such that the elastomeric seal 124, when compressed into contact with the seal ramp 60, engages the textured pattern 98 of grooves or channels 96 of the frictional load surface 12 positioned directly adjacent to the oil side portion 64 of the outer circumferential profile 56 of the seal ring body 14 and additionally is compressed into engagement with a portion 118 of the smooth surface 86 as a portion of the elastomeric seal contact surface 120 which is both positioned directly adjacent to the frictional load surface 12 and additionally is positioned directly adjacent to the air side portion 84 of the outer circumferential profile 56 of the seal ring body 14 which is exposed to the outside environment. With this configuration, and with the elastomeric seal 124 resiliently compressed into contact with the portion 118 of the smooth surface 86 as an area of the elastomeric seal interface surface 120 in between and separating the frictional load surface 12 from the air side portion 84, the portion 118 of the smooth surface 86 can thus minimize debris packing and additionally provide a further degree of sealing as a positive oil seal barrier between the elastomeric seal 124 and the elastomeric seal interface surface 120 preventing any lubricant fluid 152 which may have been fluidly communicated to the second end 92 of the frictional load surface 12 from escaping to the air side portion 84 on account of possible wear, degradation, and/or imperfections in the textured pattern 98. Furthermore, the resilient, compressive contact between the elastomeric seal 124 and the portion 118 of the smooth surface 86 can provide an added resistance or prevention of debris packing failure. In particular, the compressive interface between the elastomeric seal 124 and the portion 118 of the smooth surface 86 may facilitate the loosening and removal of any foreign matter 164 which may be introduced therebetween, on account of the interaction between the resilient compressive deflections and engagement between the elastomeric seal 124 and the portion 118 of the smooth surface 86 caused as a result of assembly 132 and machine motions. In addition, the position and arrangement of the elastomeric seal interface surface 120 as provided above can position the remaining portion of the smooth surface 86 to extend beyond the elastomeric seal interface surface 120 to the second end 68 of the seal ramp 60 along the air side portion 84 of the outer circumferential profile 56 of the seal ring body 14, and accordingly, the outside environment. Consequently, with the smooth surface 86 machined, finished or otherwise formed as a low-friction and/or low surface area to define an area of reduced or minimal surface texture positioned along and exposed to the air side portion 84 of the outer circumferential profile 56 of the seal ring body 14, the attachment or accumulation of dirt, debris, mud, moisture or any other foreign matter 164 on the exterior axial surfaces 50 of the seal ring 10 exposed to the outside environment of the sealed rotating assembly 132 may be further prevented, reduced, or substantially eliminated. Furthermore, in addition to further features, characteristics and functionalities, the presently disclosed seal ring 10 according to any one or more of the embodiments as disclosed herein may provide a more tenacious, fluid-tight seal and increased resistance against rotational slippage and additionally may reduce, minimize or substantially eliminate the accumulation of dust, dirt, debris, mud, moisture or any other foreign matter on the exterior surfaces of the seal ring without requiring additional, complimentary housing features.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A seal ring, comprising:
   one or more exterior surfaces extending between a first outer axial end of the seal ring to a seal flange, the seal flange positioned adjacent to a second outer axial end of the seal ring and extending radially outward from the one or more exterior surfaces to an outer diameter of the seal ring;
   an outer surface of the seal flange forming an annular sealing band, the annular sealing band extending radially along the second outer axial end of the seal ring and positioned adjacent to the outer diameter of the seal ring;
   an inclined seal ramp formed by one or more of the one or more exterior surfaces of the seal ring, the seal ramp extending outwardly from a first end of the seal ramp proximate to the first outer axial end of the seal ring to a second end of the seal ramp positioned adjacent to the seal flange;
   the seal ramp including a first frictional load surface positioned adjacent to the first end of the seal ramp, the first frictional load surface configured to form a frictional, sealing contact interface between the first frictional load surface and an elastomeric seal compressed into contact with the inclined seal ramp when the elastomeric seal is in a loaded state;
   wherein the seal ramp includes a second surface positioned between the first frictional load surface of the seal ramp and the seal flange, wherein the second surface is a smooth surface having a surface roughness which is lower than a surface roughness of the first frictional load surface; and
   wherein the first frictional load surface includes a first end and a second end, a plurality of raised ridges between the first end and the second end, and a substantially flat surface between two adjacent raised ridges of the plurality of raised ridges, and the second end of the first frictional load surface includes a raised annular ridge that is part of the first frictional load surface, and wherein the raised annular ridge forms a barrier at an interface between the first frictional load surface and the second surface, and increases friction at the interface as well as resistance to slippage and loss of sealing contact between the first frictional load surface and the elastomeric seal.

2. The seal ring of claim 1 wherein the first surface includes a textured pattern extending between the first end and the second end of the first surface.

3. The seal ring of claim 2 wherein the textured pattern is formed by a plurality of grooves.

4. The seal ring of claim 3 wherein the first surface includes a width which is positioned to extend along a portion of the seal ramp from the first end of the first surface to the second end of the first surface such that the elastomeric seal is compressed into contact with the first surface and a portion of the smooth surface adjacent to the second end of the first surface when the elastomeric seal is in a loaded state.

5. The seal ring of claim 1 wherein the surface roughness of the first surface corresponds to an arithmetic mean height, Ra of less than 15 μm.

6. The seal ring of claim 1 wherein the surface roughness of the first surface corresponds to an arithmetic mean height, Ra of between than 3.75-8.74 μm.

7. The seal ring of claim 4 wherein the textured pattern formed by the plurality of grooves is configured to create a network of static fluid barriers configured to prevent lubricant fluid from being fluidly communicated from the first end of the first surface to the second end of the first surface.

8. The seal ring of claim 1 wherein the seal ring is die formed.

9. A seal assembly comprising:
   an annular elastomeric seal;
   a seal ring having a seal flange and one or more exterior surfaces extending between a first outer axial end of the seal ring to the seal flange, the seal flange positioned adjacent to a second outer axial end of the seal ring and extending radially outward from the one or more exterior surfaces to an outer diameter of the seal ring;
   an outer surface of the seal flange forming an annular sealing band, the annular sealing band extending radially along the second outer axial end of the seal ring and positioned adjacent to the outer diameter of the seal ring;
   an inclined seal ramp formed by one or more of the one or more exterior surfaces of the seal ring, the seal ramp extending outwardly from a first end of the seal ramp proximate to the first outer axial end of the seal ring to a second end of the seal ramp positioned adjacent to the seal flange;
   the seal ramp including a first frictional load surface positioned adjacent to the first end of the seal ramp, the first frictional load surface configured to form a frictional, sealing contact interface between the first frictional load surface and an elastomeric seal compressed into contact with the first frictional load surface when the elastomeric seal is in a loaded state;
   wherein the seal ramp includes a second surface positioned between the first frictional load surface of the seal ramp and the seal flange, wherein the second surface is a smooth surface having a surface roughness which is lower than a surface roughness of the first frictional load surface;

wherein the first frictional load surface includes a first end and a second end, a plurality of raised ridges between the first end and the second end, and a substantially flat surface between two adjacent raised ridges of the plurality of raised ridges, and the second end of the first frictional load surface includes a raised annular ridge that is part of the first frictional load surface, and wherein the raised annular ridge forms a barrier at an interface between the first frictional load surface and the second surface, and increases friction at the interface as well as resistance to slippage and loss of sealing contact between the first frictional load surface and the elastomeric seal; and the elastomeric seal being mounted on one or more of the exterior surfaces of the seal ramp.

10. The seal assembly of claim 9 wherein the first surface includes a width which extends along a portion of the seal ramp from the first end of the first surface to the second end of the first surface.

11. The seal assembly of claim 10 wherein the width of the first surface is positioned along a portion of the seal ramp such that the elastomeric seal contacts the first surface and an adjacent portion of the second surface when the elastomeric seal is compressed into contact with the seal ramp in a loaded state.

12. The seal assembly of claim 11 wherein the width of the first surface is between 35 and 75 percent of a diameter of the elastomeric seal such that the elastomeric seal contacts the first surface and an adjacent portion of the second surface when the elastomeric seal is compressed into contact with the seal ramp in a loaded state.

13. The seal assembly of claim 12 wherein the first end of the first surface is adjacent to the first end of the seal ramp and proximate to the first outer axial end of the seal ring.

14. The seal assembly of claim 9 wherein the first surface includes a textured pattern formed by a plurality of grooves, the textured pattern extending between the first end and the second end of the first surface.

15. A seal ring, comprising:

an annular body extending axially between a first outer end and a second outer end, the annular body including a collar positioned adjacent to the first outer end of the annular body and a seal flange extending radially outwardly from the second outer end of the annular body to an outer diameter of the annular body;

an inclined seal ramp positioned between the collar and the seal flange;

the seal ramp including a frictional exterior surface positioned adjacent to the collar and a smooth exterior surface positioned adjacent to the seal flange; and wherein the inclined seal ramp and collar have a substantially uniform thickness extending throughout an axial width of the annular body from the first outer end of the annular body to the second outer end of the annular body; and wherein the frictional exterior surface includes a first end and a second end, a plurality of raised ridges between the first end and the second end, and a substantially flat surface between two adjacent raised ridges of the plurality of raised ridges, and the second end of the frictional exterior surface includes a raised annular ridge that is part of the frictional exterior surface, and wherein the raised annular ridge forms a barrier at an interface between the frictional exterior surface and the smooth exterior surface and increases friction at the interface as well as resistance to slippage and loss of sealing contact between the frictional exterior surface and an elastomeric seal compressed against the frictional exterior surface.

16. The seal ring of claim 15 wherein the annular body is die formed.

17. The seal ring of claim 15 wherein the annular body is fabricated from a sheet of metal.

18. The seal ring of claim 3 wherein at least one of the plurality of grooves includes a raised ridge.

19. The seal ring of claim 18 wherein the raised ridge is a sharpened protrusion or burr formed as a raised extension of an interior edge of the at least one of the plurality of grooves.

* * * * *